United States Patent [19]

Johnson et al.

[11] 4,370,712
[45] Jan. 25, 1983

[54] MEMORY CONTROLLER WITH ADDRESS INDEPENDENT BURST MODE CAPABILITY

[75] Inventors: Robert B. Johnson, Billerica; Chester M. Nibby, Jr., Peabody, both of Mass.

[73] Assignee: Honeywell Information Systems Inc., Waltham, Mass.

[21] Appl. No.: 202,409

[22] Filed: Oct. 31, 1980

[51] Int. Cl.³ .................. G06F 13/00; G06F 13/06; G06F 11/30; G11C 7/00
[52] U.S. Cl. ................................ 364/200; 365/230
[58] Field of Search ... 364/200 MS File, 900 MS File; 365/230

[56] References Cited

U.S. PATENT DOCUMENTS 4,025,903  5/1977  Kaufman et al. ............... 364/200
4,124,891  11/1978 Weller et al. .................. 364/200
4,149,239  4/1979  Jenkins et al. ................. 364/200
4,236,203  11/1980 Curley et al. .................. 364/200
4,241,399  12/1980 Strecker et al. ................ 364/200

Primary Examiner—Eddie Chan
Attorney, Agent, or Firm—Faith F. Driscoll; Nicholas Prasinos

[57] ABSTRACT

A memory controller couples to a number of memory modules and includes a number of control circuits. The control circuits include address counter circuits which are loaded with a portion of the address of each predetermined type of command from a requesting device. This command when decoded causes the controller to read out from the memory modules a predetermined number of words starting with any word boundary at the location specified by the stored address portion.

38 Claims, 11 Drawing Figures

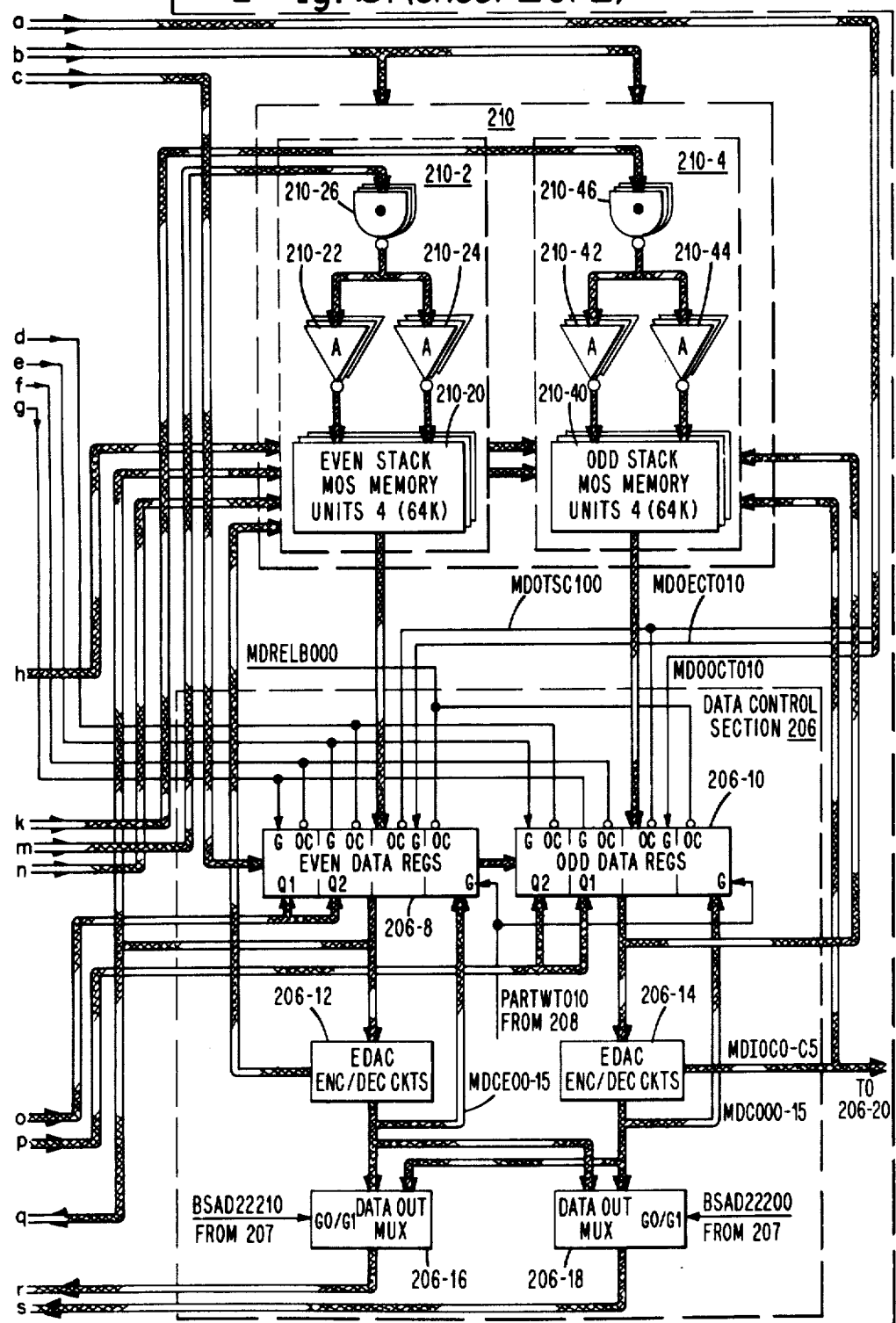

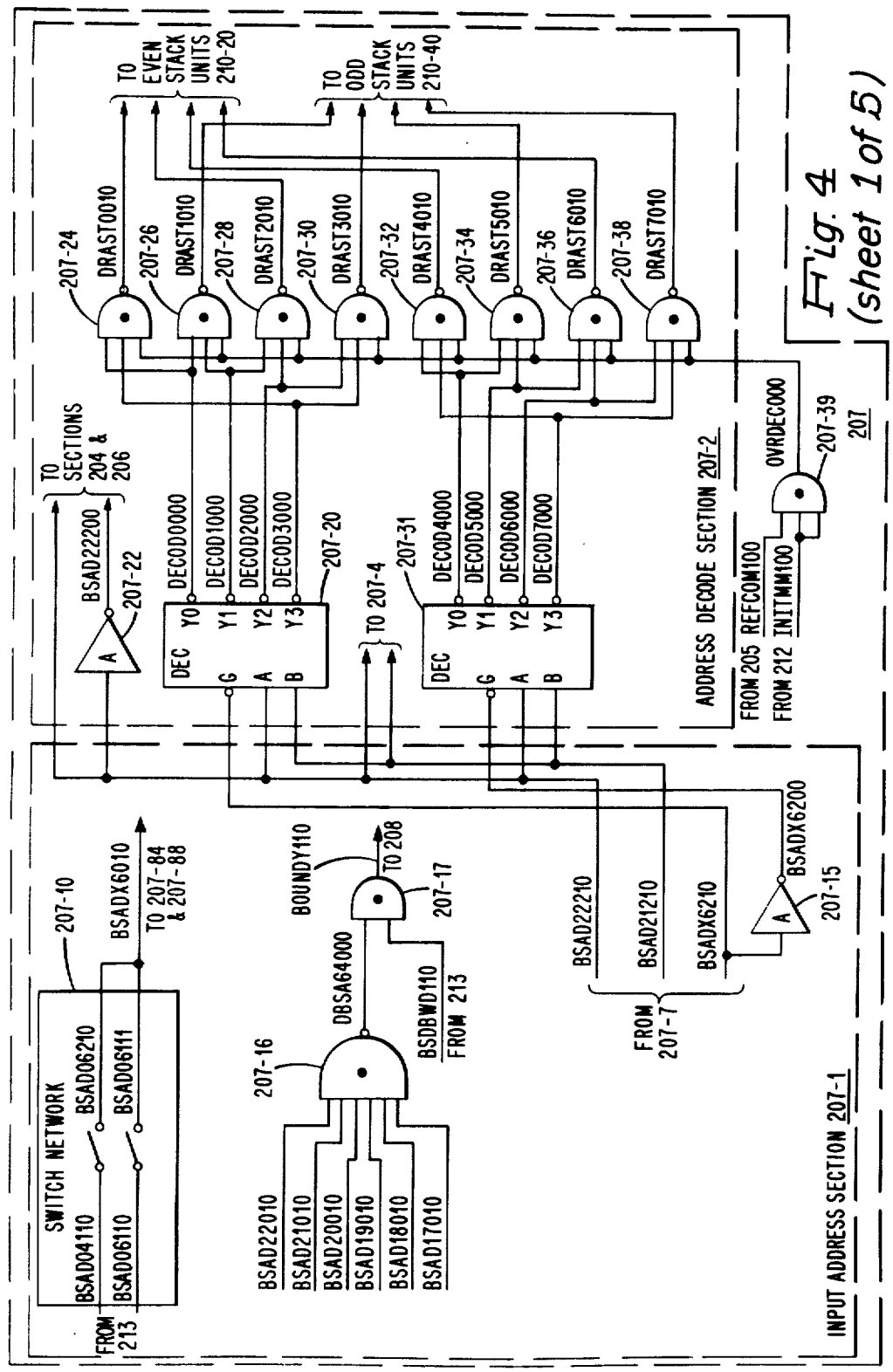
Fig. 4 (sheet 1 of 5)

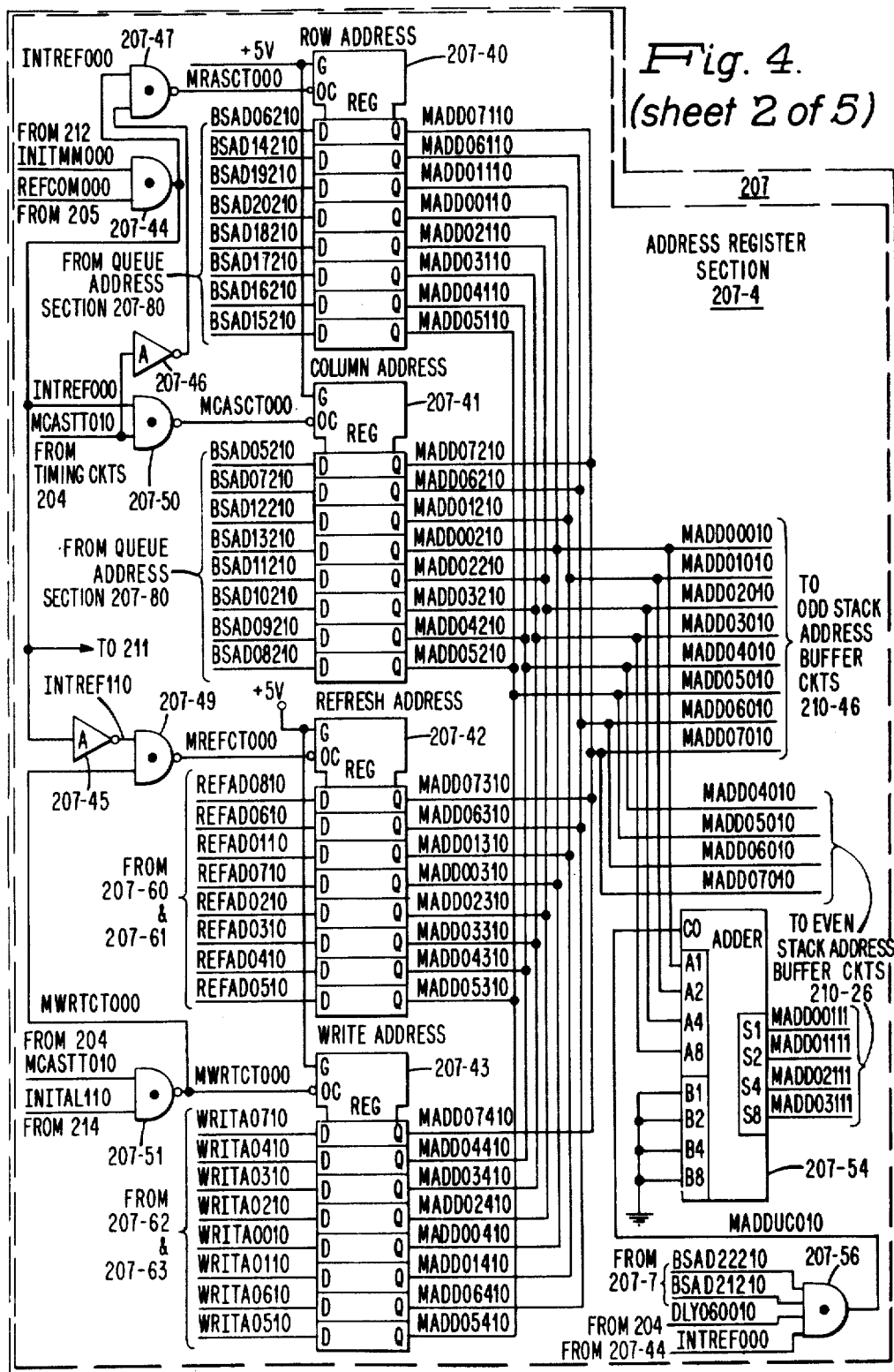
Fig. 4. (sheet 2 of 5)

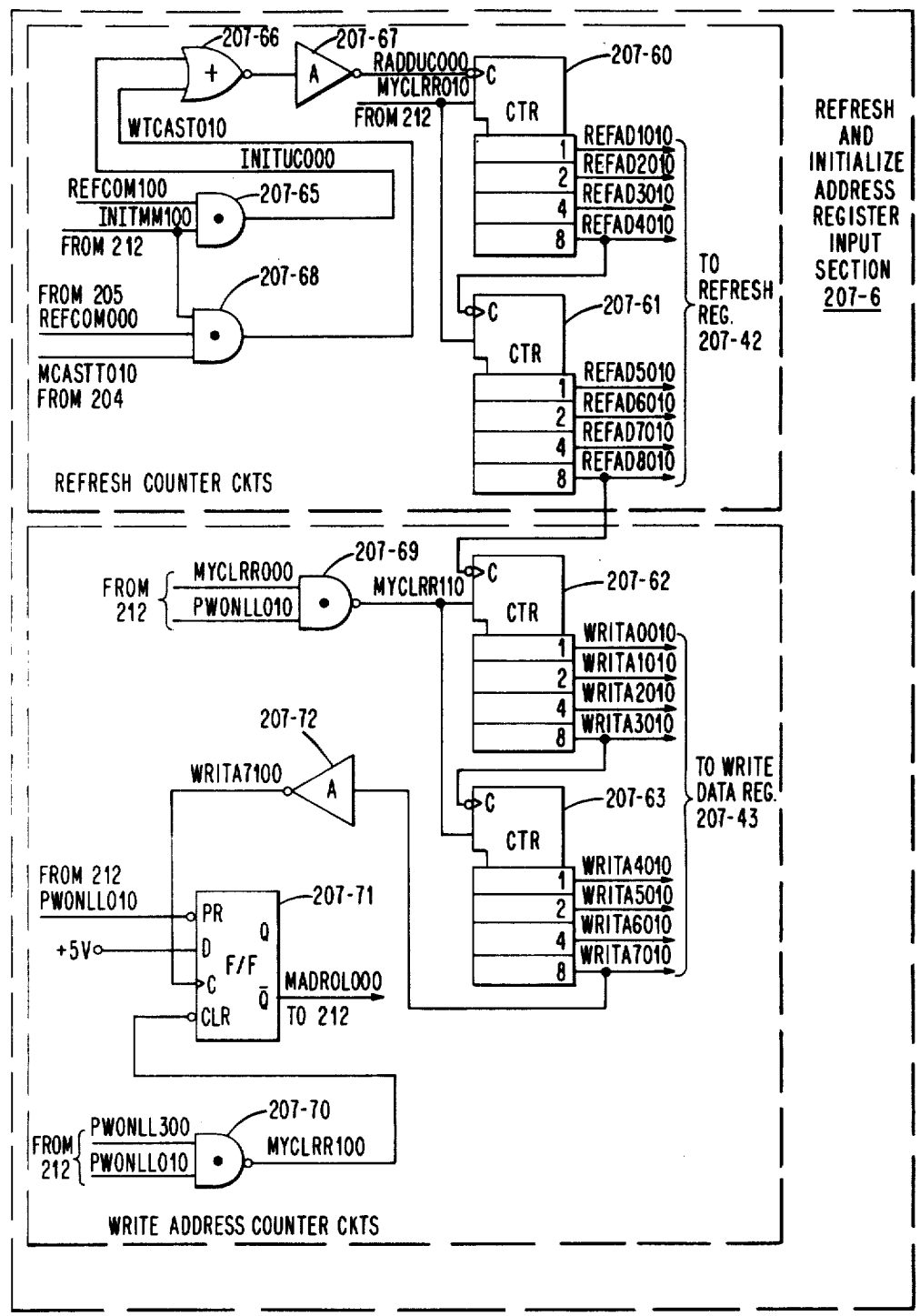
Fig. 4. (sheet 3 of 5)

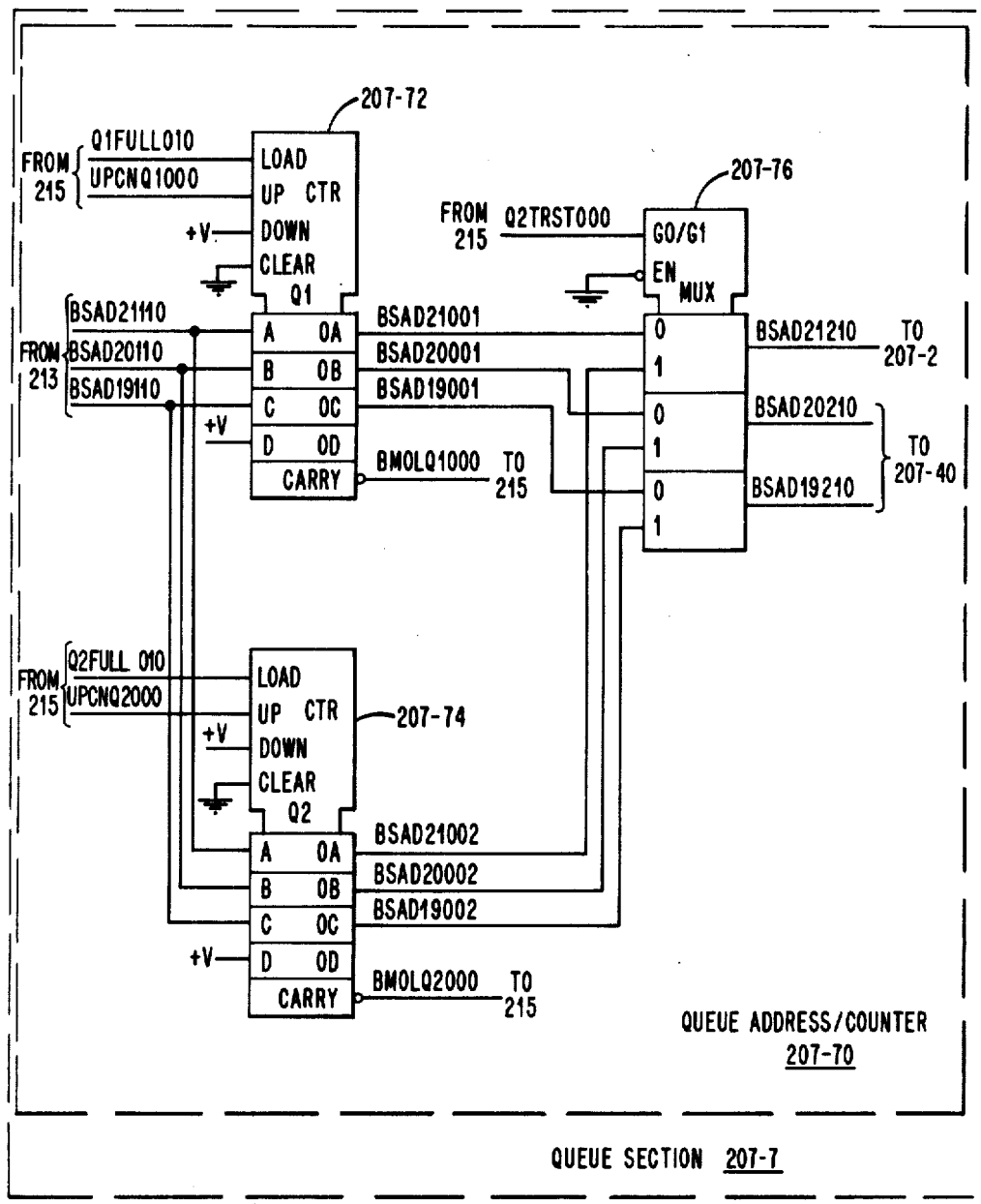
Fig. 4. (sheet 4 of 5)

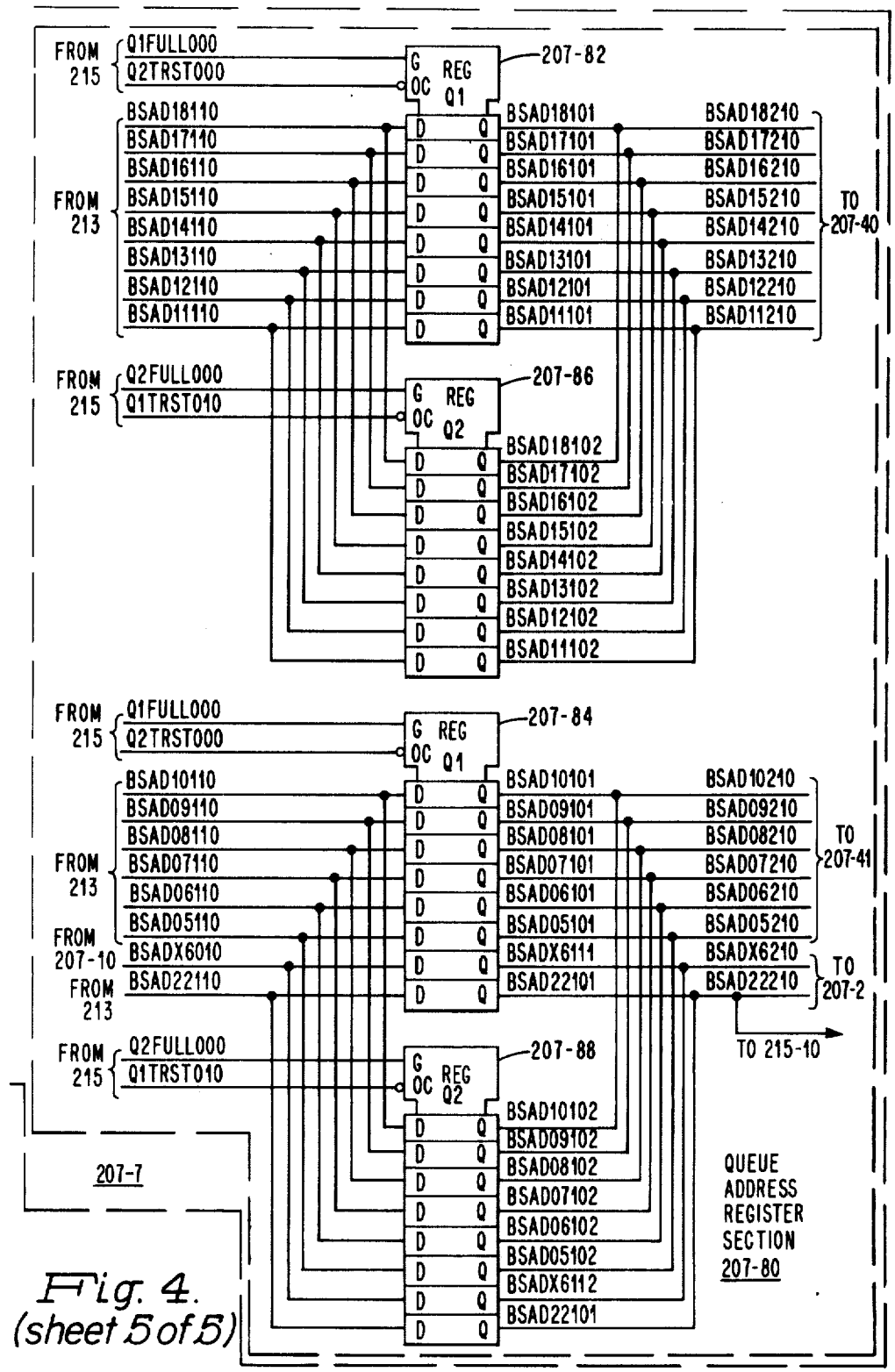
Fig. 4. (sheet 5 of 5)

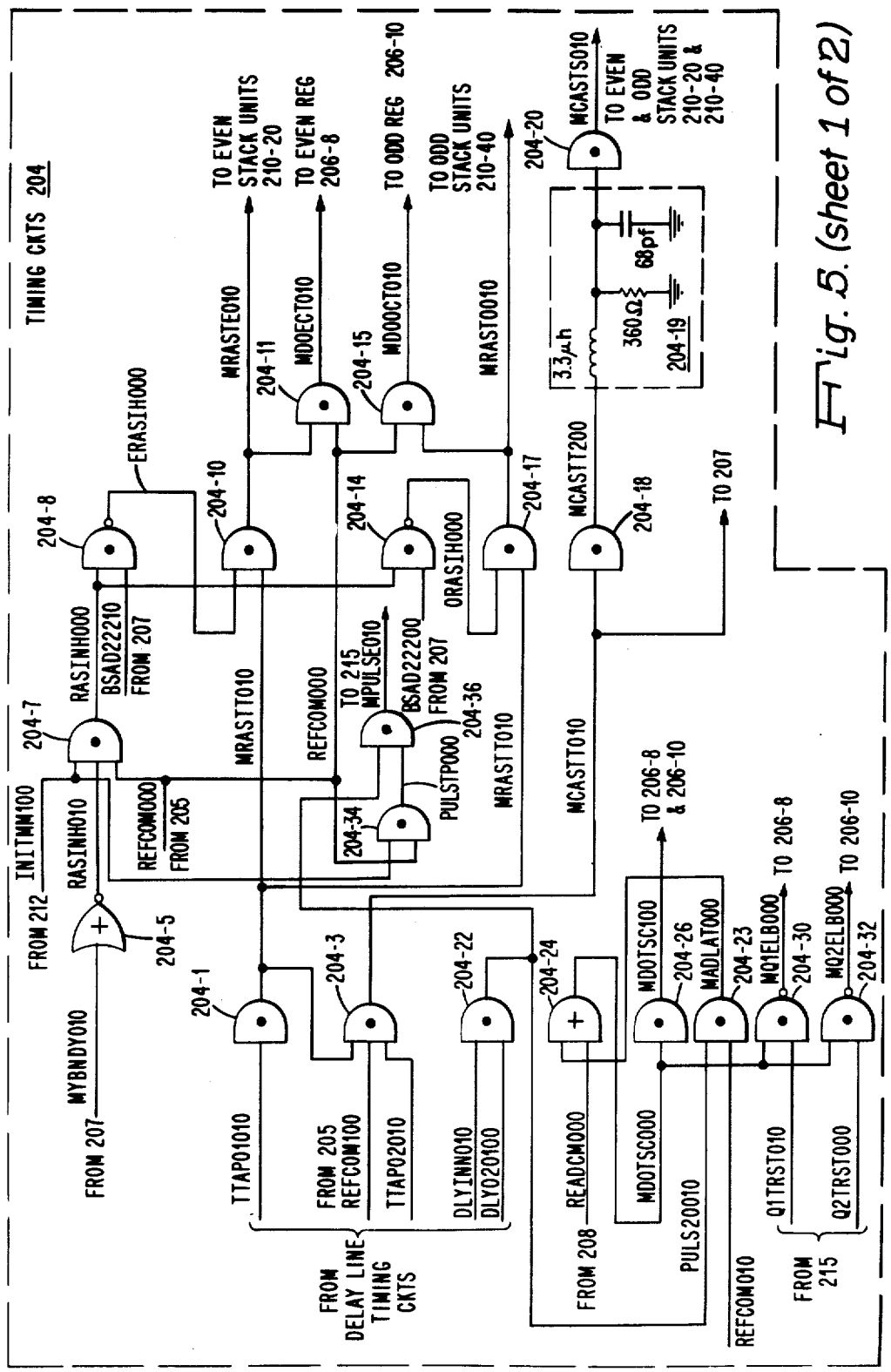
Fig. 5. (sheet 1 of 2)

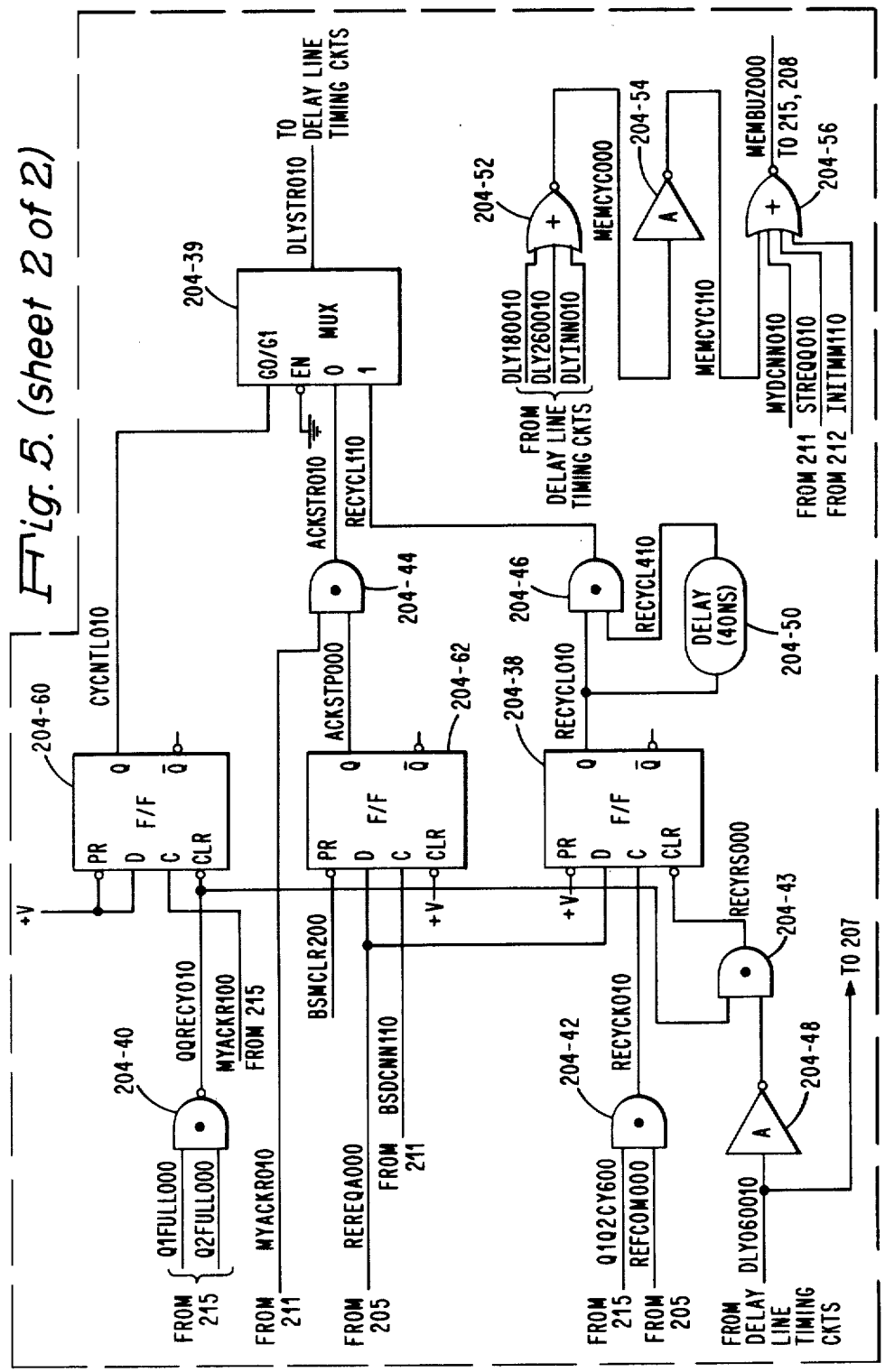
Fig. 5. (sheet 2 of 2)

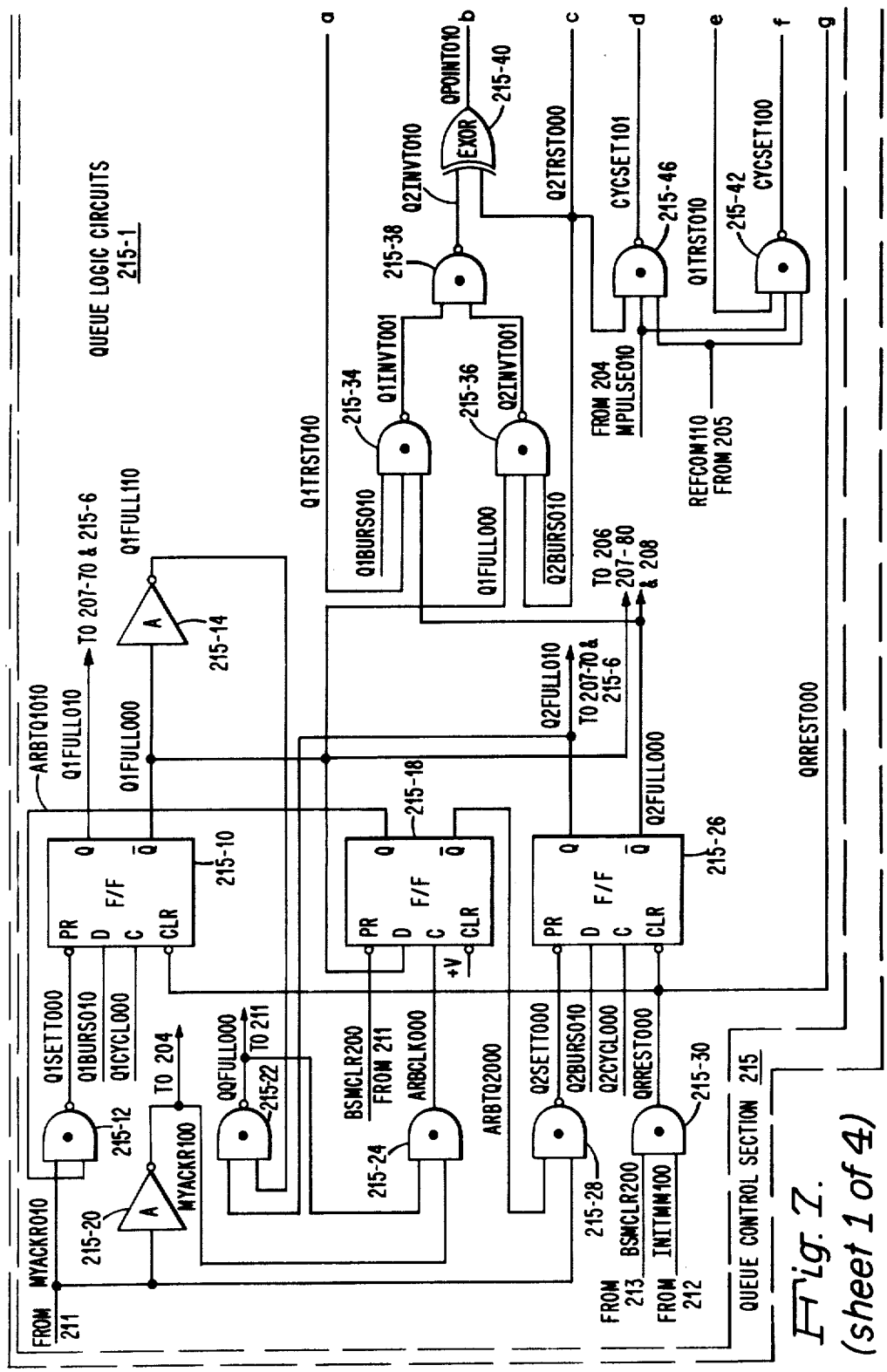
Fig. 2. (sheet 1 of 4)

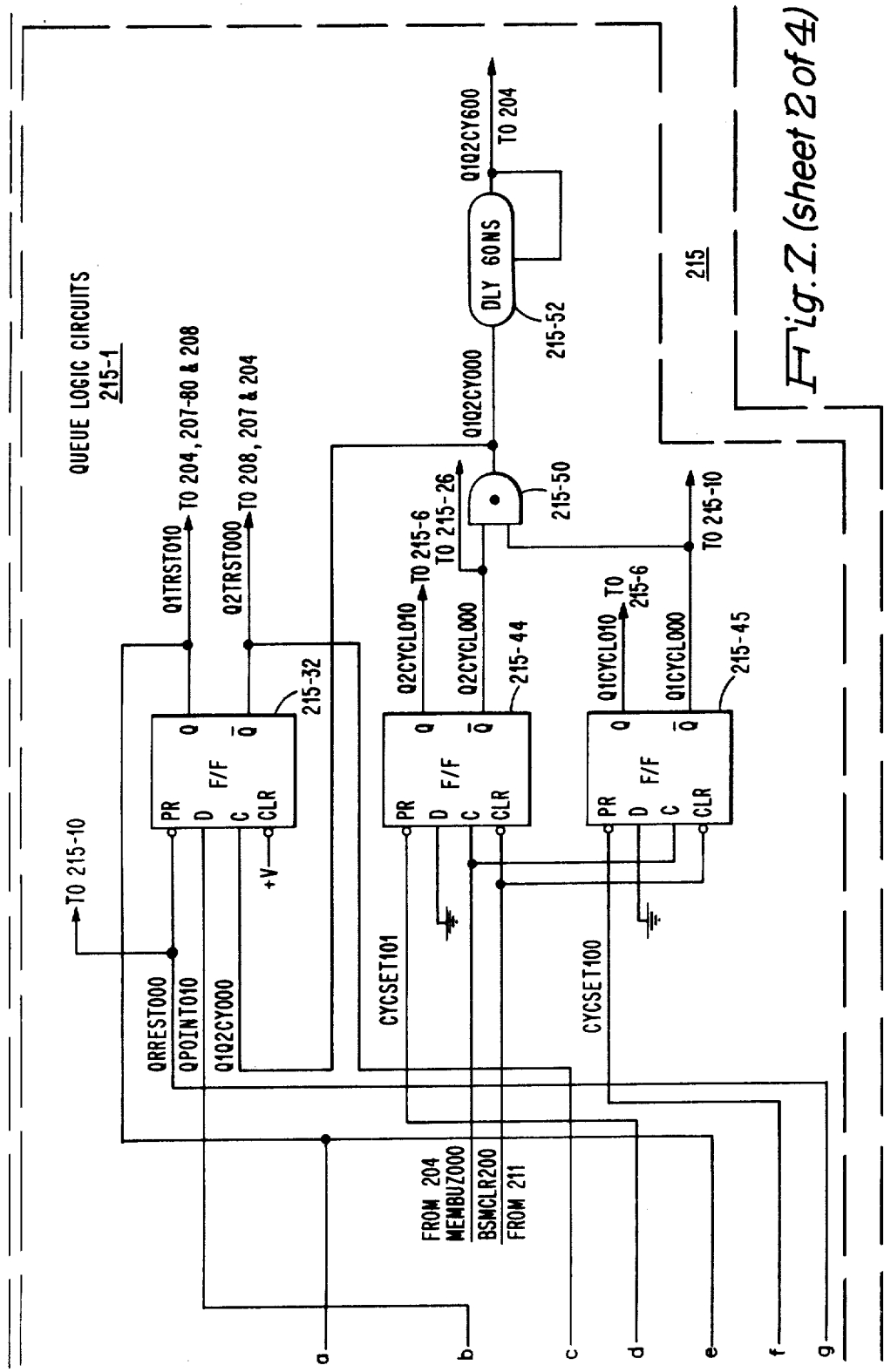
Fig. 2 (sheet 2 of 4)

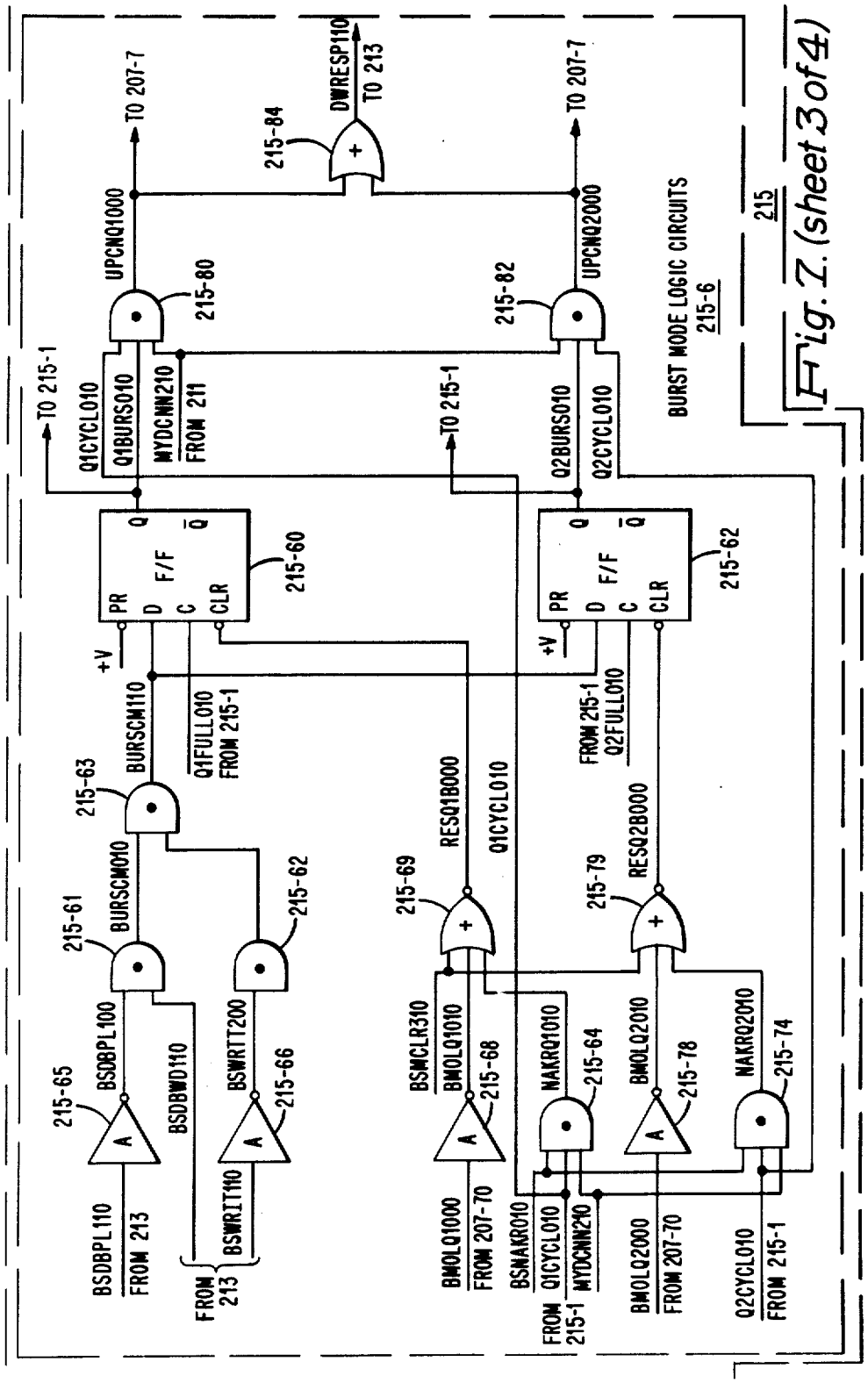
Fig. 2. (sheet 3 of 4)

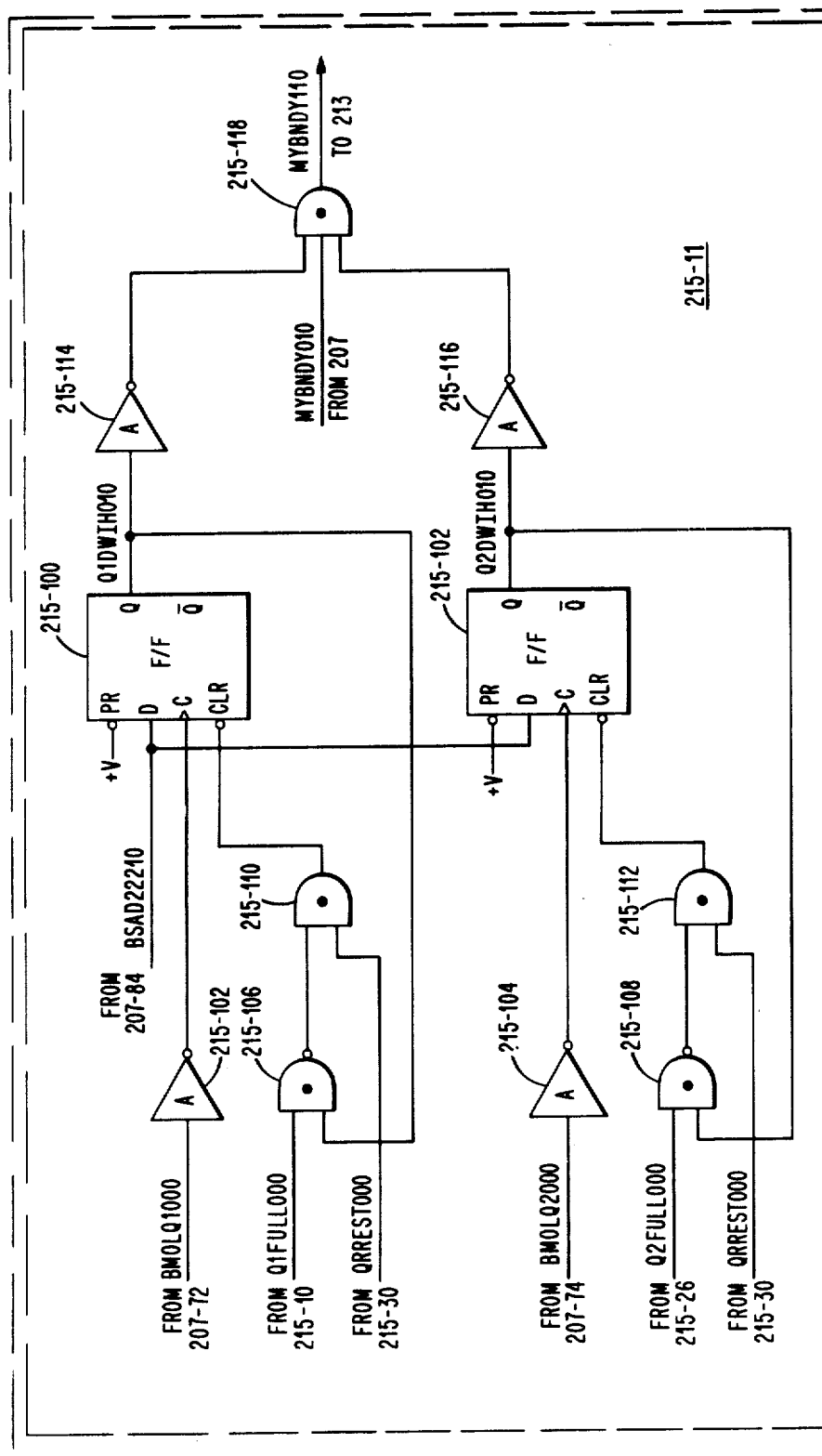
Fig. 7. (sheet 4 of 4)

MEMORY CONTROLLER WITH ADDRESS INDEPENDENT BURST MODE CAPABILITY

RELATED APPLICATIONS

1. "A Memory Controller with Burst Mode Capability", invented by Robert B. Johnson and Chester M. Nibby, Jr., Ser. No. 202,819, filed on Oct. 31, 1980, and assigned to the same assignee as named herein.

2. "A Memory Controller with Interleaved Queuing Apparatus", invented by Robert B. Johnson and Chester M. Nibby, Jr., Ser. No. 202,821, filed on Oct. 31, 1980, and assigned to the same assignee as named herein.

3. "A Memory Controller with Queue Control Apparatus", invented by Robert B. Johnson and Chester M. Nibby, Jr., Ser. No. 202,560, filed on Oct. 31, 1980 and assigned to the same assignee as named herein.

BACKGROUND OF THE INVENTION

1. Field of Use

This invention relates to memory systems and more particularly to transfers of multiple words of data between memory systems and data processing apparatus over a common bus.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in the copending patent application "System Providing Multiple Fetch Bus Cycle Operation", invented by John L. Curley, Robert B. Johnson, Richard A. Lemay and Chester M. Nibby, Jr., U.S. Pat. No. 4,236,203, issued Nov. 25, 1980 and assigned to the same assignee as named herein.

In the above prior art system, the memory system connects to an asynchronously operated single word wide bus. In the arrangement, a request for multiple words is made in a single bus cycle and the requested information words are delivered to the bus over a series of response cycles. While this arrangement improves the system throughput capabilities, it becomes desirable to be able to provide a memory system with the capability of transferring over a single bus groups of multiple words accessed simultaneously during a series of cycles without incurring communication delays. This becomes desirable where it is necessary to provide a high speed transfer of data to another memory device such as a cache unit or disk device.

Copending patent application "A Memory Controller with Burst Mode Capability", referenced herein, discloses a burst mode capability which is established as a function of the memory request address. That is, the requesting device provides an even address. In some cases, it may not be convenient to have the requesting device specify a certain type of characteristic. Also, certain error situations could alter address information making the controller 200 incorrectly enter a burst mode of operation.

Accordingly, it is a primary object of the present invention to provide a memory controller which is able to respond to memory requests specifying a multiword transfer.

It is a further object of the present invention to provide a memory controller with the capability of transferring groups of data words over a common bus during consecutive bus cycles of operation starting with any word boundary.

SUMMARY OF THE INVENTION

The above objects are achieved in a preferred embodiment of the memory controller of the present invention. The memory controller couples to a bus in common with a number of command generating units (e.g. central processing unit, disk controller). The controller is coupled to control the operation of at least one memory module unit or memory module through at least one control circuit. The control circuit includes an address counter circuit which operatively couples to the number of memory modules to apply address signals for specifying the locations to be addressed during each of a number of successive memory cycles of operation.

The controller of the present invention also includes mode control circuits and boundary detection and signalling control circuits. The mode control circuits couple to the control circuits and to the bus. The boundary detection and signalling control circuits couple to the address counter circuit and to the bus. The mode control circuits in response to each predetermined type of request specifying the read out of a number of data words cause the address counter circuit to be loaded with a predetermined portion of the address included in the request.

The mode control circuits also condition the controller to operate in a predetermined mode of operation wherein words are read out from consecutive locations of the number of modules starting at the location specified by the predetermined address portion. In accordance with the present invention, the predetermined mode of operation is established independently of the address included within the request. During such read operation, the contents of the address counter circuit are incremented by one during each successive memory cycle of operation.

The address counter circuit upon being incremented to a predetermined count generates an output signal indicating the termination of the predetermined type of memory operation. The boundary detection and signalling control circuits in response to the output signal generate a response signal on the bus indicating whether or not the address boundary established by the address counter circuit was detected to have been exceeded. The receipt of a response signal by the requesting unit signals that the last word being transferred by the controller is not valid. The mode control circuits in response to the output signal enable the controller to accept another predetermined type of request.

The preferred embodiment of the controller of the present invention includes a plurality of control address counter circuits enabling a plurality of memory requests to be processed. Each control address counter circuit has a number of stages for defining the desired maximum number of data words which can be read out to the bus starting at any word boundary. The controller when placed in a predetermined mode operates to provide a high speed automatic transfer of a plurality of words whose number is established in accordance with the predetermined address portion included in each predetermined type of request. By having the mode of operation of the controller established independently of the request address, the requesting unit need not include additional circuits for generating requests with special address characteristics. Also, this prevents the controller from incorrectly switching to a predetermined mode of operation because of incorrect address information.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4 through 9 illustrate in greater detail the different portions of the memory subsystem 20 of FIG. 3.

GENERAL DESCRIPTION OF SYSTEM OF FIG. 1

Figure 1:
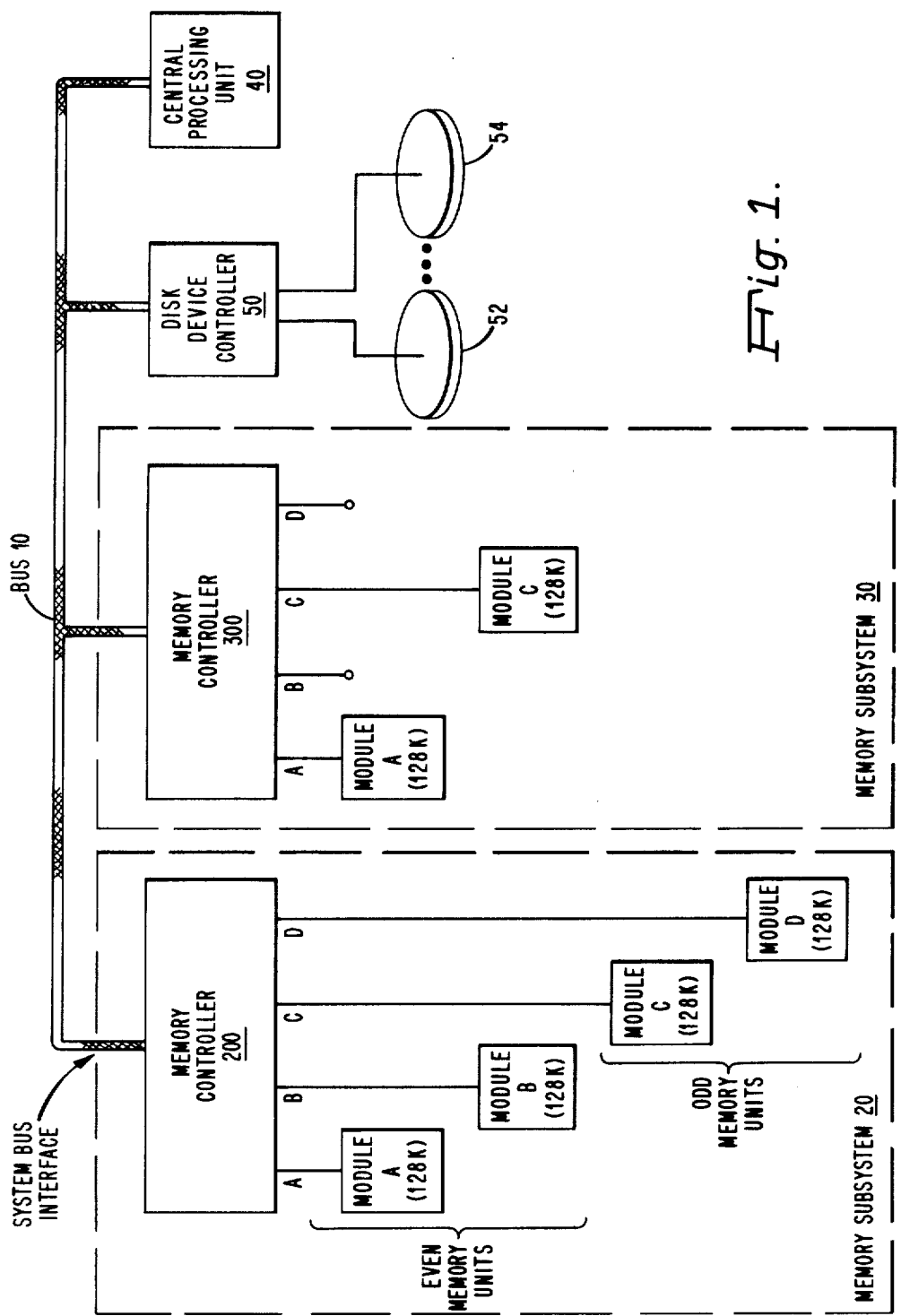
FIG. 1 shows in block diagram form a system which incorporates the controller apparatus of the present invention.

FIG. 1 illustrates a data processing system which includes the apparatus of the present invention. Referring to the figure, it is seen that the system includes a multiline bus 10 coupled to a plurality of memory subsystems 20 and 30, to a central processing unit (CPU) 40 and to a disk device controller 50 which controls the operation of one or more disk devices 52 and 54. While only one controller is shown, it will be appreciated that the system of FIG. 1 will normally include other units such as those disclosed in U.S. Pat. No. 4,000,485 issued Dec. 28, 1976. The memory subsystems 20 and 30, each include a memory controller which can address up to four memory module units. In FIG. 1, memory controller 300 is connected to address the module units labeled A and C while memory controller 200 is connected to address the module units labeled A through D.

The CPU 40 is a microprogrammed processing unit which may for the purposes of the present invention may be considered conventional in design. The copending patent application cited above in addition to the patent application "System Providing Multiple Outstanding Information Requests", invented by Richard A. Lemay and John L. Curley, Ser. No. 867,266, filed Jan. 5, 1978, now U.S. Pat. No. 4,181,974 and assigned to the same assignee as named herein may be consulted for further details. Also, the related patent application of George J. Barlow, et al., titled "Interface for Controlling Information Transfers between Main Data Processing Systems Units and a Central Subsystem" referenced herein may also be consulted.

Figure 2:
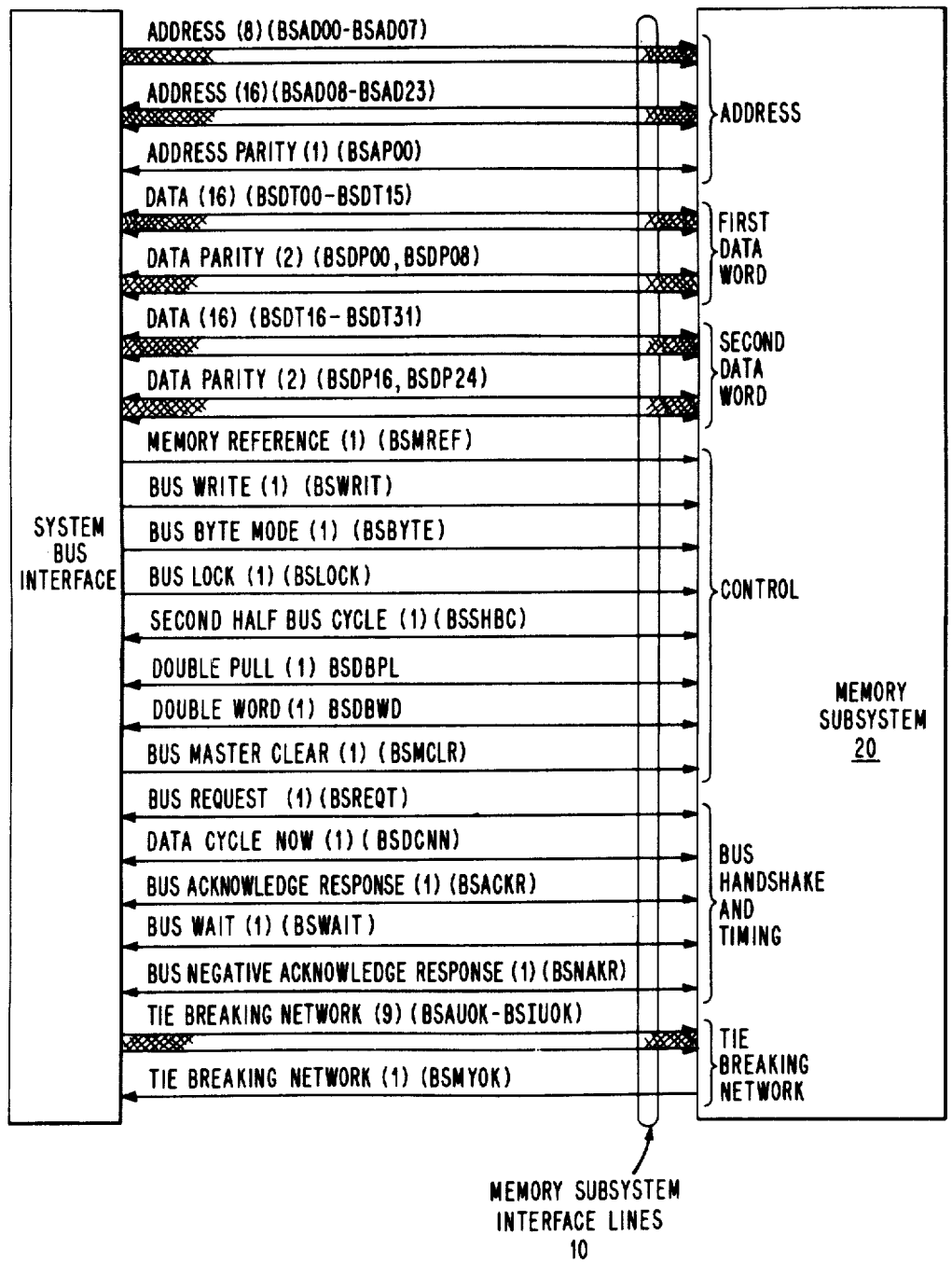
FIG. 2 shows in detail the lines of the bus 10 which connect to each of the units of FIG. 1.

The CPU 40 as well as each controller and memory subsystems 20 and 30 communicates over the bus 10 in a predetermined manner as set forth in U.S. Pat. No. 4,000,485. Briefly, a unit wishing to communicate requests a bus cycle and when the bus cycle is granted, the unit becomes the "master" and is able to address any other unit in the system as the "slave". In the cases of those bus exchanges which require a response (e.g. memory read operation), the requesting unit as "master" identifies itself and indicates to the "slave" unit that a response is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines discussed in connection with FIG. 2, a unit is able to designate to the other unit, the type of cycle or operation being initiated or performed.

A distributed tie-breaking network grants bus cycles and resolves simultaneous requests for use of bus 10. Priority is granted on the basis of physical position on bus 10, the highest priority being given to the first unit on the bus. In a typical system, the memory subsystem is granted the highest priority and the CPU is granted the lowest priority with the other units being positioned on the basis of their performance requirements.

MEMORY SUBSYSTEM INTERFACE

Before describing the controller of FIG. 1, it is seen that there are a number of lines which constitute the interface between the controller and a bus. As shown, the interface lines include a number of address lines (BSAD00-23, BSAP00), two sets of data lines (BSDT00-15, BSDP00, BSDP08) and (BSDT16-31, BSDP16, BSDP24), a number of control lines (BSMREF-BSMCLR), a number of timing lines (BSREQT-BSNAKR), and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00-BSAD23 | The bus address lines constitute a twenty-four bit wide path used in conjunction with the bus memory reference line BSMREF to transfer a 24-bit address to controller 200 or a 16-bit identifier from controller 200 to the bus (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23 = 1 = right byte; BSAD23 = 0 = left byte). When used for identification, lines BSAD00-BSAD07 are not used. The lines BSAD08-BSAD23 carry the identification of the receiving unit as transmitted to controller 200 during the previous memory read request. |
| BSAP00 | The bus address parity line is a bidirectional line which provides an odd parity signal for the address signals applied to lines BSAD00-BSAD07. |
| | Data Lines |
| BSDT00-BSDT15, BSDT16-BSDT31 | The sets of bus data lines constitute a 32-bit or two word wide bidirectional path for transferring data or identification information between |

MEMORY SUBSYSTEM INTERFACE LINES

| Designation | Description |
|---|---|
| | controller 200 and the bus as a function of the cycle of operation being performed. During a write cycle of operation, the bus data lines transfer information to be written into memory at the location specified by the address signals applied to lines BSAD00–BSAD23. During the first half of a read cycle of operation, the data lines BSDT00–BSDT15 transfer identification information (channel number) to the controller 200. During the second half of the read cycle, the data lines transfer the information read from memory. |
| BSDP00, BSDP08, BSDP16, BSDP24 | The bus data parity lines are two sets of bidirectional lines which provide odd parity signals coded as follows: BSDP00=odd parity for signals applied to lines BSDT00–BSDT07 (left byte); BSDP08=odd parity for signals applied to lines BSDT08–BSDT15 (right byte); BSDP16=odd parity for signals applied to lines BSDT16–BSDT23; and BSDP24=odd parity signals applied to lines BSDT24–BSDT31. |
| | Control Lines |
| BSMREF | The bus memory reference line extends from the bus to the memory controller 200. When set to a true state, this line signals the controller 200 that the lines BSAD00–BSAD23 contain a complete memory controller address and that it is performing a write or read operation upon the specified location. When reset to a false state, the line signals controller 200 that the lines BSAD00–BSAD23 contain information directed to another unit and not controller 200. |
| BSWRIT | The bus write line extends from the bus to the memory controller 200. This line when set to a true state, in conjunction with line BSMREF being true, signals controller 200 to perform a write cycle of operation. When reset to a false state, this line, in conjunction with line BSMREF being true, signals controller 200 to perform a read cycle of operation. |
| BSBYTE | The bus byte line extends from the bus to controller 200. This line, when set to a true state, signals controller 200 that it is to perform a byte operation rather than a word operation. |
| BSLOCK | The bus lock line extends from the bus to controller 200. When set to a true state, this line signals controller 200 of a request to perform a test or change the status of a memory lock flip-flop included within the controller 200. |
| BSSHBC | The bus second half bus cycle line is used to signal a unit that the current information applied to the bus by controller 200 is the information requested by a previous read request. In this case, both controller 200 and the unit receiving the information are busy to all units from the start of the initiation cycle until controller 200 completes the transfer. This line is used in conjunction with the BSLOCK line to set or reset its memory lock flip-flop. When a unit is requesting to read or write and line |

MEMORY SUBSYSTEM INTERFACE LINES

| Designation | Description |
|---|---|
| | BSLOCK is true, the line BSSHBC, when true, signals controller 200 to reset its lock flip-flop. When in a false state, it signals controller 200 to test and set its lock flip-flop. |
| BSMCLR | The bus master clear line extends from the bus to controller 200. When this line is set to a true state, it causes the controller 200 to clear to zeros certain bus circuits within controller 200. |
| BSDBWD | The double word line is a unidirectional line which extends from the controller 200 to bus 10. This line together with the BSDBPL line is used during read requests to indicate how many words of data and in what format are being provided by memory controller 200. During read response cycles from memory controller 200, the state of line BSDBWD indicates whether one or two words of data are being applied to bus 10. When line BSDBWD is forced to a binary ONE state, this indicates that two words are being transferred. When only one word is being transferred, line BSDBWD is forced to a binary ZERO. |
| BSDBPL | The double pull line is a bidirectional line which extends between controller 200 and bus 10. This line together with line BSDWB indicates whether the response is the first (not the last) or the last unit of data requested. |
| | Bus Handshake/Timing Lines |
| BSREQT | The bus request line is a bidirectional line which extends between the bus and controller 200. When set to a true state, it signals the controller 200 that another unit is requesting a bus cycle. When reset to a false state, it signals controller 200 that theree is no bus pending bus request. This line is forced to a true state by controller 200 to request a read second half bus cycle. |
| BSDCNN | The data cycle line is a bidirectional line which extends between the bus and controller 200. When forced to a true state, the line signals the controller 200 that a unit was granted a requested bus cycle and placed information on the bus for another unit. The controller 200 forces the line to a true state to signal that it is transmitting requested data back to a unit. Prior to this, controller 200 had requested and been granted a bus cycle. |
| BSACKR | The bus acknowledge line is a bidirectional line which extends between the bus and controller 200. When set to a binary ONE by controller 200, the line signals that it is accepting a bus transfer during a read first half bus cycle or write cycle. During a read second half bus cycle, this line when set to a binary ONE by the unit which originated the request signals the controller 200 of its acceptance of a transfer. |
| BSWAIT | The bus wait line is a bidirectional line which extends between the bus and controller 200. When set to a true or binary ONE state by controller 200, it signals a requesting unit that the controller cannot accept a transfer at this time. Thereafter, the unit will |

MEMORY SUBSYSTEM INTERFACE LINES

| Designation | Description |
|---|---|
| | initiate successive retries until the controller 200 acknowledges the transfer. The controller 200 sets the BSWAIT line true under the following conditions:<br>1. It is busy when all-quene registers are full.<br>2. It is requesting a read second half bus cycle.<br>3. It is busy when placed in an initialize mode.<br>When the BSWAIT line is set to a true or binary ONE state by a unit, this signals the controller 200 that the data is not being accepted by the requesting unit and to terminate its present bus cycle of operation. |
| BSNAKR | The bus negative acknowledge line is a bidirectional line which extends between the bus and controller 200. When this line is set to a true or binary ONE state by controller 200, it signals that it is refusing a specified transfer. The controller 200 sets line BSNAKR to a true state as follows:<br>1. Memory lock flip-flop is set to a binary ONE, and<br>2. The request is to test and set the lock flip-flop (BSLOCK true and BSSHBC false).<br>In all other cases, when the memory lock flip-flop is set, controller 200 generates a response via the BSACKR line or the BSWAIT line or generates no response.<br>When the BSNAKR line is forced true by a unit, this signals controller 200 that the data is not accepted by the unit and to terminate its cycle of operation. |
| | Tie Breaking Control Lines |
| BSAUOK-BSIUOK | The tie breaking network lines extend from the bus to controller 200. These lines signal controller 200 whether units of higher priority have made bus requests. When all the signals on these lines are binary ONES, this signals controller 200 that it has been granted a bus cycle at which time it is able to force the BSDCNN line to a binary ONE. When any one of the signals on the lines is a binary ZERO, this signals controller 200 that it has not been granted a bus cycle and is inhibited from forcing line BSDCNN to a binary ONE. |
| BSMYOK | The tie breaking network line extends from controller 200 to the bus. Controller 200 forces this line to a false or binary ZERO state to signal other units of lower priority of a bus request. |

GENERAL DESCRIPTION OF THE SYSTEM OF FIG. 1

Figure 3:
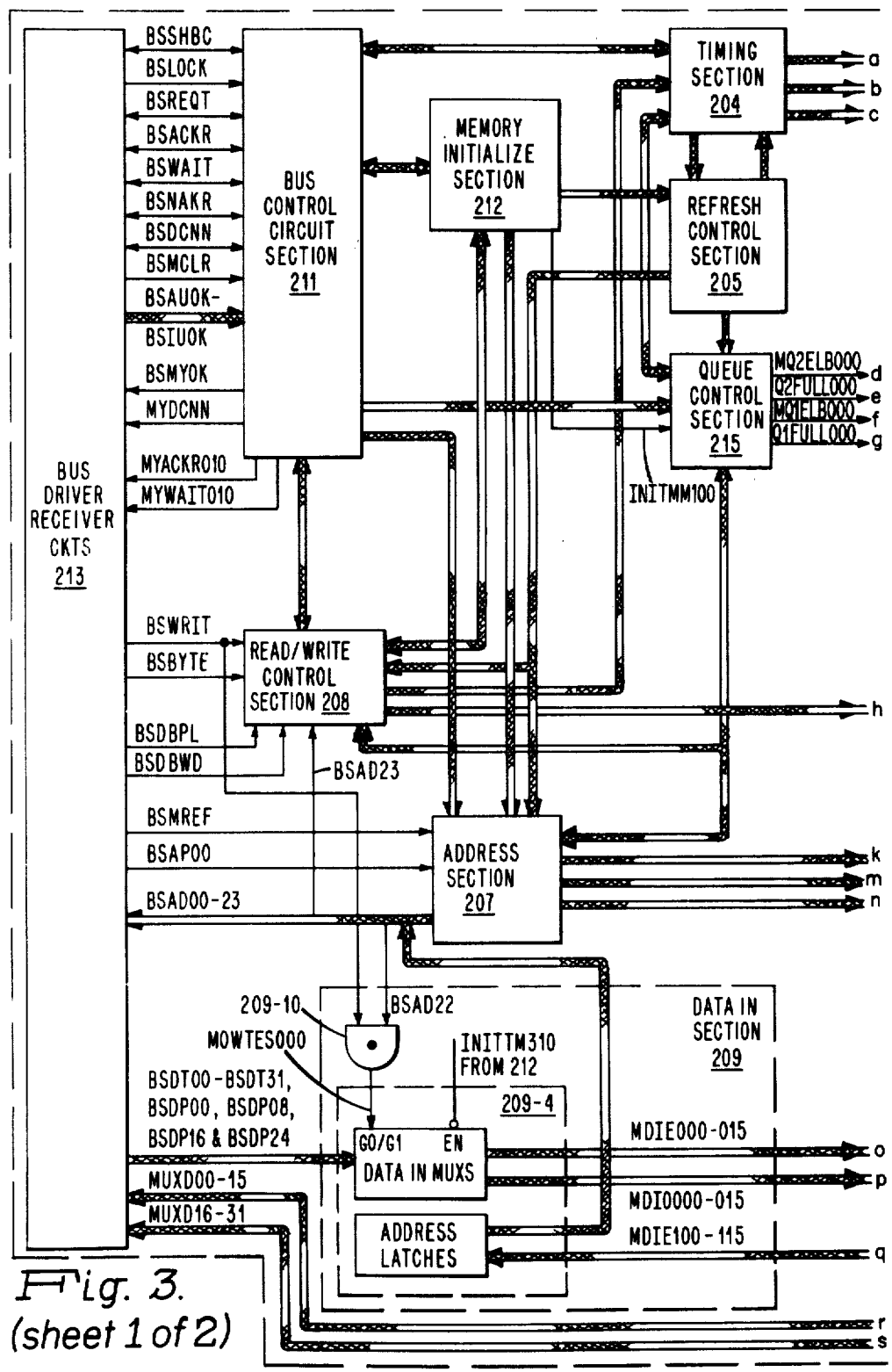
FIG. 3 shows in block diagram form the memory subsystem 20 of FIG. 1.

FIG. 1 shows a preferred embodiment of memory subsystem 20 including controller 200 which is constructed using the principles of the present invention. Referring to FIG. 3, it is seen that the controller 200 controls the two 256K word memory module units 210-2 and 210-4 of memory section 210. The module units of blocks 210-2 and 210-4 include high speed MOS random access memory integrated circuits corresponding to blocks 210-20 and 210-40, and address buffer circuits corresponding to blocks 210-22 through 210-26 and 210-42 through 210-46. Each 256K memory unit is constructed from 64K word by 1-bit dynamic MOS RAM chips illustrated in greater detail in FIG. 9. More specifically, referring to FIG. 9, it is seen that each 256K by 22-bit memory module includes 88, 65,534 (64K) word by 1-bit chips. Within each chip there are a number of storage arrays organized in a matrix of 256 rows by 256 columns of storage cells.

The controller 200 includes those circuits required to generate memory timing signals, perform refresh operations, rewrite control operations, data transfer operations, address distribution and decoding operations and bus interface operations. Such circuits are included as part of the different sections of FIG. 3.

The sections include a timing section 204, a refresh control section 205, a queue control section 215, a data control section 206, an address section 207, a read/write control section 208, a data-in section 209, a bus control circuit section 211, a memory initialize circuit section 212, and bus driver/receiver circuit section 213.

The bus control section 211 includes the logic circuits which generate signals for generating and accepting bus cycle requests for single and double word operations. As seen from FIG. 1, these circuits as well as the circuits of the other sections are connected to a bus via the driver/receiver circuits of section 213 which were conventional in design. The section 211 includes the tie breaking network circuits which resolve requests priority on the basis of a unit's physical position on the bus. The memory controller, located at the left most or bottom position of the bus, is assigned the highest priority while a central processing unit (CPU), located at the right most or top position of the bus is assigned the lowest priority. For further information regarding bus operation, reference may be made to U.S. Pat. No. 4,000,485 which issued Dec. 28, 1976.

The timing section 204, shown in detail in FIG. 5, includes circuits which generate the required sequence of timing signals from memory read and write cycles of operation. As seen from FIG. 3, this section transmits and receives signals to and from sections 205, 206, 207, 208, 211 and 215.

The address section 207, shown in greater detail in FIG. 4, includes circuits which decode, generate and distribute address signals require for refresh operations, initialization and read/write selection. The section 207 receives address signals from lines BSAD08-BSAD23 and address lines BSAD00-BSAD07 and BSAP00 in addition to the memory reference control signal from the BSMREF line. Additionally, section 207 receives control and timing signals from sections 204, 212 and 205.

The memory initialization section 212 includes circuits, conventional in design, for clearing the memory controller circuits to an initial or predetermined state.

The read/write control section 208 includes register and control logic circuits, conventional in design. The register circuits receive and store signals corresponding to the states of the BSWRIT, BSBYTE, BSDBPL, BSDBWD and BSAD23 lines in addition to boundary signal BOUNDY110 from section 207. The control circuits decode the signals from the register circuits and generate signals which are applied to sections 204, 207 and 210 for establishing whether the controller is to perform the read, write or read followed by a write cycle of operation (i.e., for a byte command).

The refresh section 205 includes the circuits for periodically refreshing the contents of the memory. Section 205 receives timing and control signals from section 204 and provides refresh command control signals to sections 204, 207, 208 and 212. For further details, reference may be made to U.S. Pat. No. 4,185,323 which discloses circuits for generating refresh command (REFCOM) signals.

The data in section 209 circuits of block 209-4 include a pair of multiplexer circuits and an address register which is connected to receive signals from section 206. The multiplexer circuits, conventional in design, receive data words from the two sets of bus lines BSDT00-15 and BSDT16-31 and apply the appropriate words via the sets of output lines MDIE000-015 and MDIO000-015 to the correct memory modules during a write cycle of operation. That is, multiplexer circuits are selectively enabled by signal MOWTES000 generated by an AND gate 209-10 when initialize signal INITTM310 from 212 is a binary ZERO (i.e., not in an initialize mode). The AND gate 209-10 generates signal MOWTES000 as a function of bus address bit 22 (i.e., signal BSAD22) and whether the memory subsystem is doing a write operation (i.e., signal BSWRIT). During a write operation, signal MOWTES000 selects the correct data word (i.e., the word applied to bus lines BSDT00-15 or BSDT16-31) to be applied to the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be with the module identification information transmitted via the bus lines BSDT00-15. Since this is not pertinent to an understanding of the present invention, it will not be further discussed herein.

The data control section 206 includes two tristate operated data registers 206-8 and 206-10 and multiplexer circuits 206-16 and 206-18 with associated control circuits which enable data to be written into and/or read from the even and odd memory units 210-20 and 210-40 of section 210. For example, during a double wide read cycle operation, operand or instruction signals are read out from the units 210-20 and 210-40 into the even and odd output registers 206-8 and 206-10. During a write cycle of operation, the byte operand signals are loaded into the leftmost section of the pair of registers 206-8 and 206-10 from the bus via section 209-4 and written into the odd or even unit of section 210.

The controller 200 includes error detection and correction (EDAC) apparatus wherein each word contains 16 data bits and 6 check bits used to detect and correct single bit errors in the data words and detect and signal without correction, double bit errors in the data word. The EDAC apparatus includes two sets of EDAC encoder/decoder circuits 206-12 and 206-14. These circuits may take the form of those circuits disclosed in U.S. Pat. No. 4,072,853 which issued Feb. 7, 1978. Additionally, the section 206 enables a return of identification information received from the data lines BSDT00-15 and stored in register 209-4 via the address lines BSAD08-23.

In accordance with the teachings of the present invention, queue control section 215 includes circuits for storing address and control information for concurrently processing a plurality of memory requests. As seen from FIG. 3, section 215 receives control signals from sections 204, 205, 207, 211 and 212. The section provides control signals to sections 206, 207 and 208 as shown.

Pertinent portions of the above sections will now be discussed in greater detail with reference to FIGS. 4 through 9.

DETAILED DESCRIPTION OF CONTROLLER SECTIONS

Only those sections which are believed necessary to an understanding of the present invention are described herein. For further information regarding the remaining sections, reference may be made to the related patent applications or to U.S. Pat. No. 4,185,323.

Section 204 and Section 206

FIG. 5 illustrates in greater detail, the timing circuits of section 204. The circuits receive input timing pulse signals TTAP01010, TTAP02010, DLY060010, DLYINN010 and DLY020100 from delay line timing generator circuits, not shown, conventional in design. Such circuits may take the form of the timing generator circuits shown in U.S. Pat. No. 4,185,323. The timing generator circuits generate a series of timing pulses via a pair of series connected 200 nanosecond delay lines in response to the signal MYACKR010 being switched to a binary ONE. These pulses in conjunction with the circuits of block 204 establish the timing for the remaining sections during a memory cycle of operation.

Additionally, the circuits of block 204 receive a boundary signal MYBNDY010 and address signals BSAD22200 and BSAD22210 from section 207 Also, section 212 applies an initialize signal INITMM100 to section 204. The signal MYBNDY010 is applied to a NOR gate 204-5 which forces signal RASINH010 to a binary ZERO when forced to a binary ONE. The series connected AND gate 204-7 logically combines initialize signal INITMM100, refresh command signal REFCOM000 generated by circuits within section 204, not shown, to produce signal RASINH000. A NAND gate 204-8 combines signals RASINH000 and address signal BSAD22210 to produce an even row strobe inhibit signal ERASIH000. The signal is applied to an AND gate 204-10 for combining with a timing signal MRASTT010 derived from signal TTAP01010 via an AND gate 204-1. The result output signal MRASTE010 is applied to the RAS timing input of the even stack units 210-20.

A NAND gate 204-14 combines signals RASINH010 and BSAD22200 to produce an odd row inhibit signal ORASIH000. This signal is combined in an AND gate 204-17 with timing signal MRASTT010 to generate row timing signal MRAST0010. This signal is applied to the RAS timing input of the odd stack units 210-40.

As seen from FIG. 5, an AND gate 204-11 applies a timing signal MDOECT010 to a G input terminal of the right middle section of even data register 206-8 in the absence of a refresh command (i.e., signal REFCOM000=1). Similarly, an AND gate 204-15 applies a timing signal MDOOCT010 to a G input terminal of the right middle section of odd data register 206-10. The delay network 204-19 which connects in series with AND gates 204-3, 204-18 and 204-20 generates timing signal MCASTS010. The signal MCASTS010 is applied to the CAS timing input of the even and odd stack units 210-20 and 210-40.

The even and odd data registers 206-8 and 206-10 are tristate operated. More specifically, the registers are constructed from D-type transparent latch circuits such as those designated SN74S373 manufactured by Texas Instruments Incorporated. The register circuits are transparent meaning that while the signal applied to the G input terminal is a binary ONE, the signals at the Q output terminals follow the signals applied to the D input terminals. That is, where the signal applied to the G input terminal goes low, the signal at Q output terminal latches.

The output terminals of registers 206-8 and 206-10 are connected in common in a wired OR arrangement for enabling the multiplexing of the pair of data word signals. Such multiplexing is accomplished by controlling the states of the signals MQ2ELB000, MQ1ELB000, MDOTSC000, and MDRELB000 applied to the output control (OC) input terminals of the different sections of registers 206-8 and 206-10 shown in FIG. 3. This operation is independent of the latching action of the register flip-flops which takes place in response to the signals applied to the G input terminals.

The series connected group of gates 204-22 through 204-26 control the state of signal MDOTSC100. The AND gate 204-22 receives timing signals DLYINN010 and DLY020100 at the beginning of a read or write cycle for enabling the storage of identification information from the bus. The section 204 further includes a pair of series connected AND gates 204-34 and 204-36 which generate signal MPULSE010 in response to timing signal PULS20210 in the absence of a refresh command (i.e., signal REFCOM000 is a binary ONE) or when the controller 200 is not being initialized (i.e., signal INITMM100 is a binary ONE). During a read operation, read command signal READCM000 is forced to a binary ZERO which causes AND gate 204-26 to force signal MDOTSC100 to a binary ZERO.

The signal MDOTSC100, when a binary ZERO, enables the right middle sections of registers 206-8 and 206-10 to apply their contents to their output terminals. During a write cycle, when read command signal READCM000 is forced to a binary ONE, AND gate 204-26 forces signal MDOTSC100 to a binary ONE. This produces the opposite result to that described. That is, signal MDOTSC100 inhibits the right middle sections of registers 206-8 and 206-10 from applying their contents to their output terminals.

The left most sections of registers 206-8 and 206-10 are enabled to apply their contents to their output terminals when signal MDRELB000 is a binary ZERO. Signal MDRELB000 for the purposes of the present invention can be considered to be in a binary ONE state. Thus, the right most sections of the registers are inhibited from applying their contents to their output terminals.

The left two most sections of registers 206-8 and 206-10 are controlled by the states of signals MQ1ELB000 and MQ2ELB000 which are generated by a pair of NAND gates 204-30 and 204-32. Signal MDOTSC000 when a binary ZERO enables one of the two left most sections of either register 206-8 or 206-10 as a function of the states of signals Q1TRST010 and Q2TRST000 from section 215. When signal Q1TRST010 is a binary ONE, signal Q2TRST000 is a binary ZERO and NAND gate 204-30 forces signal MQ1ELB000 to a binary ZERO. This enables the Q1 section of registers 206-8 and 206-10 to apply their contents to their output terminals. Conversely when signal Q1TRST010 is a binary ZERO, signal Q2TRST000 is a binary ONE and NAND gate 204-32 forces signal MQ1ELB000 to a binary ZERO. This enables the Q2 sections of registers 206-8 and 206-10 to apply its contents to its output terminals.

Lastly, the section 204 further includes a plurality of circuits which restart the delay line timing circuits (not shown) of section 204. These circuits include a number of D-type flip-flops 204-38, 204-60 and 204-62, a multiplexer circuit 204-39, a NAND gate 204-40, a number of AND gates 204-42 through 204-46, an inverter circuit 204-48 and a delay circuit 204-50 which connect as shown. The circuits generate as an output, delay line start signal DLYSTR010 which is applied to the timing generator delay line circuits.

The flip-flop 204-60 is switched to a binary ZERO state when signal QQRECY010 is forced to a binary ZERO by NAND gate 204-40. This occurs when both of the signals Q1FULL000 and Q2FULL000 are binary ONES signalling that both queues are empty. When a binary ZERO, flip-flop 204-60 forces signal CYCNTL010 to a binary ZERO causing the multiplexer circuit 204-39 to select as its output, signal ACKSTR010 applied to the 0 input terminal. When one or both queues are full (i.e., one or both of the signals Q1FULL000 and Q2FULL000 are binary ZEROS), NAND gate 204-40 forces signal QQRECY010 to a binary ONE. This enables flip-flop 204-60 to switch to a binary ONE state in response to the positive going transition of signal MYACKR100. The signal CYCNTL010 when forced to a binary ONE, causes the multiplexer circuit 204-39 to select as an output, signal RECYCL110 applied to the 1 input terminal.

AND gate 204-44 switches signal ACKSTR010 to a binary ONE when memory acknowledge signal MYACKR010 is forced to a binary ONE following the receipt of a memory request. This occurs when signal ACKSTP000 is a binary ONE. Flip-flop 204-62 forces signal ACKSTP000 to a binary ONE when signal REREQA000 from refresh section 205 is a binary ONE. In instances where signal REREQA000 is forced to a binary ZERO, this inhibits flip-flop 204-62 from switching to a binary ONE in response to bus signal BSDCNN110. Hence, AND gate 204-44 is inhibited from forcing signal ACKSTR010 to a binary ONE.

In a similar fashion, flip-flop 204-38 switches to a binary ONE state in response to signal Q1QCY600 which occurs 60 nanoseconds following the end of a queue cycle of operation. At this time, signal REFCOM000 is assumed to be a binary ONE. This, in turn, forces signal RECYCL010 to a binary ONE causing AND gate 204-46 to force signal RECYCL110 to a binary ONE following a delay of 40 nanoseconds. However, when either signal REREQA000 or signal REFCOM000 is forced to a binary ZERO, this inhibits flip-flop 204-38 from being switched to a binary ONE. It will be noted that signal DLY060010 applied via AND gate 204-43 ensures that flip-flop 204-38 is cleared to a binary ZERO state prior to the end of a queue cycle of operation. Additionally, signal QQRECY010 applied via AND gate 204-43 ensures that flip-flop 204-38 is cleared to a binary ZERO state when both queues are empty. This avoids any false starts (i.e., memory cycles) being produced when an early refresh signal is generated (i.e., signal REREQA000 switches to a binary ZERO) at the same time a memory request is received.

Block 204 of FIG. 5 also includes circuits for generating memory bus signal MEMBUZ000. These circuits include a pair of NOR gates 204-52 and 204-56 and inverter circuit 204-54 connected as shown. The signal MEMBUZ000 is generated as a function of signal MEMCYC110 which is derived from the timing signals from the delay line timing circuits in addition to signals MYDCNN010, STREQQ010 and INITMM110. When any one of these signals is forced to a binary ONE, MEMBUZ000 is forced to a binary ZERO indicating that controller 200 is busy performing a memory read (MYDCNN010=1), is busy obtaining a bus cycle (STREQQ010=1) or is busy initializing its contents (INITMM110=1).

Section 207

FIG. 4 illustrates the different sections of address section 207. As shown, section 207 includes an input address section 207-1, an address decode section 207-2, an address register section 207-4 and a refresh and initialize address register input section 207-6 and a queue section 207-7.

Sections 207-1 and 207-2

The input address section 207-1 includes a set of manually selectable switches of block 207-10 which receive bus address signals BSAD04110 and BSAD06110. These switches select the high order bus address bit which selects the upper/lower 256K of memory when the system includes the full complement of 128K memory modules. When the memory modules are constructed using 64K chips, the top switch is placed in the closed position. This selects address bit 4 (signal BSAD04110) as the high order bus address bit. For 16K chips, the other switch is placed in the closed position which selects address bit 6.

The input address section 207-1 also includes boundary detection circuits. These circuits include a NAND gate 207-16 which connects to an AND gate 207-17. The AND gate 207-17 is connected to receive a double word signal BSDBWD110 from line BSDBWD. The NAND gate 207-16 receives the memory request address bits 22-17 from bus 10 and forces output detected boundary signal DBSA64000 to a binary ZERO when address bits 22-17 are all binary ONES. This, in turn, causes AND gate 207-17 to switch signal BOUNDY110 from a binary ZERO to a binary ONE state when signal BSDBND110 is a binary ONE. The signal BOUNDY110 is applied as an input to section 208.

Since it is assumed that the memory modules are 64K chips, the top switch is closed while the other switch is opened. The resulting high order bit signal BSADX6010 is applied as an input to section 207-80. Signal BSADX6210 in addition to its complement along with the least significant bus address bits 22 and 21 (i.e., signals BSAD22210 and signal BSAD21210) from section 207-7 are applied as inputs to section 207-2. Also, the least significant bit address signal BSAD22210 and its complement signal BSAD22200 generated by an inverter circuit 207-22 are applied to sections 204 and 206. The high order bit signal BSADX6210 is applied to the enable/gate input terminal of decoder circuit 207-20. The complement signal BSADX6200 generated by an inverter circuit 207-15 is applied to the enable/gate input of decoder circuit 207-31, together with address signals BSAD22210 and BSAD21210. When high order address signal BSADX6210 is a binary ZERO, decoder circuit 207-20 is enabled for operation. Similarly, when signal BSADX6210 is a binary ONE, decoder circuit 207-31 is enabled for operation.

Each of the four decode outputs DECOD0000 through DECOD3000 connects to a different pair of the NAND gates 207-24 through 207-30. It will be noted that the zero decode signal DECOD0000 connects to the inputs of NAND gates 207-24 and 207-26 which generate the 0 and 1 row address strobe signals. Similarly, the 1 decode signal DECOD1000 connects to the inputs of NAND gates 207-26 and 207-28 which generate the 1 and 2 row address strobe signals. The next sequential decode signal DECOD2000 connects to the two NAND gates which generate the next pair of sequential row address strobe signals. Lastly, the last decode signal DECOD3000 connects to NAND gates 207-30 and 207-24 which generate the 3 and 0 row address strobe signals. In a similar fashion, each of the four decode outputs DECOD4000 through DECOD7000 connects to a different pair of the NAND gates 207-32 through 207-38.

As seen from FIG. 4, all of the NAND gates 207-24 through 207-30 and 207-32 through 207-38 receive a further input signal OVRDEC000 generated by an AND gate 207-39. When either initialize signal INITMM100 or refresh command signal REFCOM100 is forced to a binary ZERO by the circuits of section 212 or section 204, AND gate 207-39 forces signal OVRDEC000 to a binary ZERO. This turns on all the decode signals (i.e., signals DRAST0010 through DRAST7010 are forced to binary ONES) enabling eight memory locations to be written simultaneously during an initialize mode of operation, or "refreshed" during a refresh mode. As shown, the even row address strobe signals DRAST0010 and DRAST2010 are applied to the RAM chips of the even stack units 210-20. The odd row address strobe signals DRAST1010 and DRAST3010 are applied to the RAM chips of the odd stack units 210-40.

Section 207-4

The address register section 207-4 as shown in FIG. 4 receives the address signals BSAD05210 through BSAD20210 from queue address section 207-80 of FIG. 4 as inputs to different stages of a row address register 207-40 and a column address register 207-41. Also, as seen from FIG. 4, this section receives address inputs from the circuits of block 207-6 which are applied to different stages of a refresh address register 207-42 and a column address register 207-43. The enabling gate input terminals of registers 207-40 through 207-43 are connected to receive a +5 volts source. The OC input terminal of row address register 207-40 is connected to receive a timing signal MRASCT000 generated by AND gate 207-44, inverter circuit 207-46 and NAND gate 207-47 in response to signals INITMM000, REFCOM000 and MCASTT010. The OC input terminal of column address register 207-41 is connected to receive a timing signal MCASCT000 generated by NAND gate 207-44 and NAND gate 207-50 in response to signals INTREF000 and MCASTT010. The signal INTREF000 is generated by AND gate 207-44 which receives signals INITMM000 and REFCOM000. The OC input terminal of refresh address register 207-42 is connected to receive a control signal MREFCT000 generated by NAND gate 207-49, NAND gate 207-51 and inverter circuit 207-45, in response to signals INTREF000, MCASTT010 and INITMM110.

Each of the address registers 207-40 through 207-43 are constructed from D-type transparent latch circuits such as those designated as SN74S373 previously discussed. As seen from FIG. 4, the different address output terminals of the registers of each set are connected in common in a wired OR arrangement for enabling the multiplexing of these address signals. As previously described, such multiplexing is accomplished by controlling the state of the signals applied to the output control (OC) input terminals of the registers 207-40 through 207-43.

More specifically, the output control (OC) terminals enable so-called tristate operation which are controlled by the circuits 207-44 through 207-51. When each of the signals MRASCT000, MCASCT000, MREFCT000 and MWRTCT000 is in a binary ONE state, this inhibits any address signals from being applied to the Q output terminals of the register. As mentioned, this operation is independent of the latching action of the register flip-flops.

Additionally, section 207-4 includes a 4-bit binary full adder circuit 207-54, conventional in design. The adder circuit 207-54 is connected to increment by one, the low order address bits 20 through 17. In greater detail, the input terminal A1–A8 receive signals MADD00010 through MADD03010. Binary ZERO signals are applied to input terminals B1-B8. An AND gate 207-56 generates a carry in signal MADDUC010 as a function of the states of the least significant address signals BSAD22210 and BSAD21210, signal INTREF000 and timing signal DLY060010.

Figure 9:
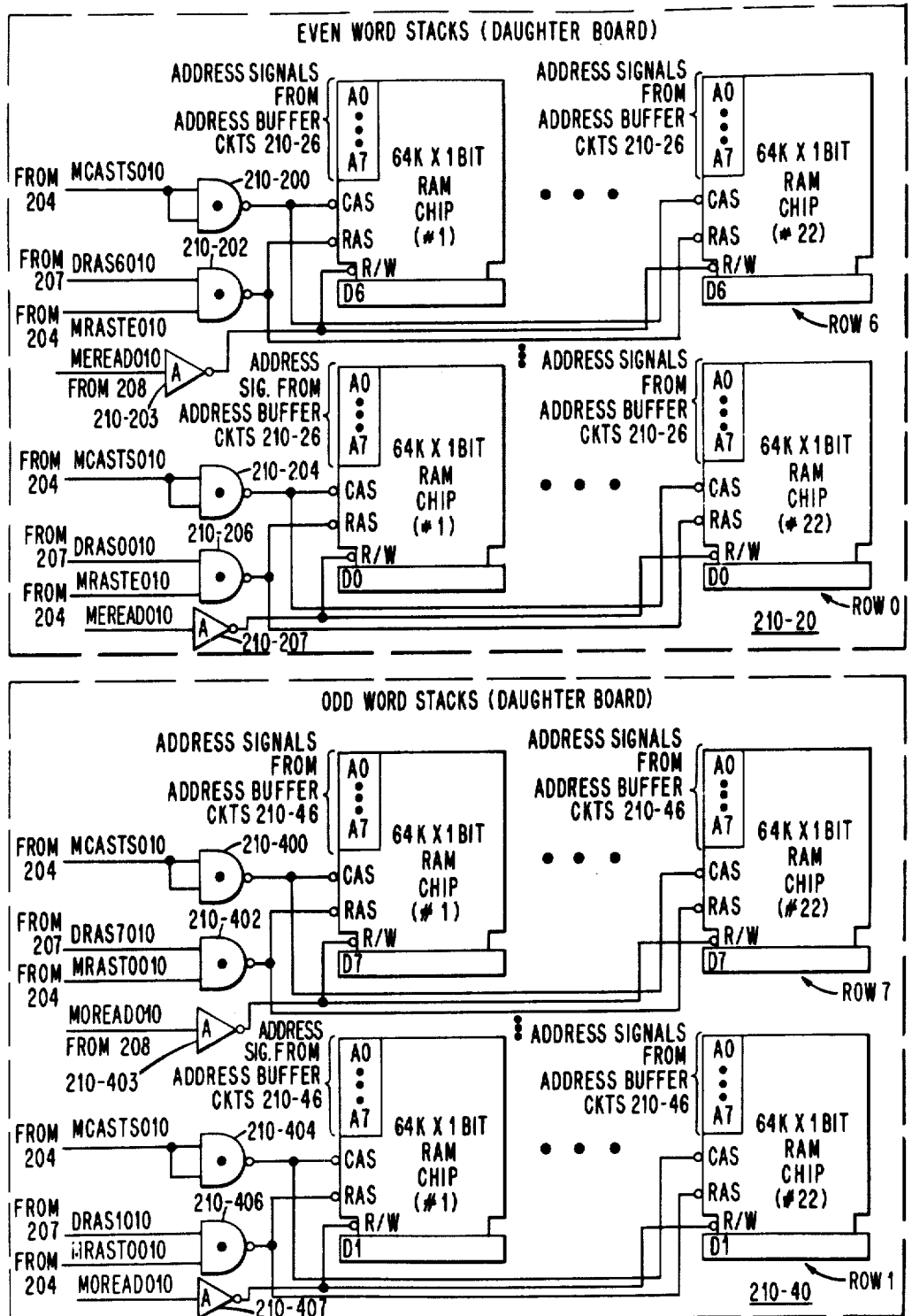

The incremented output signals MADD00111 through MADD03111 appearing at adder sum terminals S1-S8 are applied via address buffer circuits 210-26 to the even stack RAM chips of FIG. 9. The same is true of signals MADD0410 through MADD07010. The odd stack RAM chips of FIG. 9 are connected to receive the address signals MADD0010 through MADD07010 via address buffer circuits 210-46.

Section 207-6

The refresh and initialize address register input section 207-6 includes the refresh counter and write address counter circuits which generate the address values applied to the refresh and write address registers of section 207-4. As shown, the refresh counter circuits include two series connected binary counters 207-60 and 207-61, each constructed from 74LS393 type circuit chips. Counter 207-60 is connected to receive a clocking signal RADDUC000 which is generated by an inverter circuit 207-67, NOR gate 207-66 and AND gates 207-65 and 207-68 in response to signals INITMM100, REFCOM000, MCASTT010 and REFCOM100. Both counters receive a clearing signal MYCLRR010 from section 212.

The write counter circuits also include two series connected binary counters 207-62 and 207-63 which are driven by signal REFAD8010 from the refresh counter circuits. Both counters receive a clearing signal MYCLRR110 generated by a NAND gate 207-69 in response to signals MYCLRR000 and PWONLL010.

The circuits further include a D-type flip-flop 207-71 which serves as an extra stage of counter 207-63. The flip-flop 207-71 is connected to receive the complement signal WRITA7100 of most significant write address bit signal WRITA7100 from an inverter circuit 207-72. Initially, when signal WRITA7010 is a binary ZERO, signal WRITA7100 is a binary ONE. Upon power-up, the D-type flip-flop 20-71 is cleared by signal MYCLRR100. When signal WRITA7010 switches to a binary ONE at the end of a first pass, signal WRITA7100 switches from a binary ONE to a binary ZERO which has no effect on the state of flip-flop 207-71. Upon completion of a second pass, signal WRITA7010 switches back to a binary ZERO which causes signal WRITA7100 to switch flip-flop 207-71 from a binary ZERO to a binary ONE. At this time, signal MADROL000 switches from a binary ONE to a binary ZERO. The signal MADROL000 is applied to section 213 and is used to signal the completion of the initialization operation. The flip-flop 207-71 is enabled for operation by signal PWONLL010 and a +5 volt signal which are applied to the preset and D input terminals, respectively. Also, and NAND gate 207-70 applies a signal MYCLRR100 to the clear input terminal which is generated in response to signal PWONLL300 and PWONLL010 from section 212.

Queue Section 207-7

As seen from FIG. 4, the section 207-7 includes a queue address/counter section 207-70 and queue address register section 207-80. The section 207-70 includes a pair of 4-bit binary counters 207-72 and 207-74 whose outputs connect to a two input multiplexer circuit 207-76. The counters are constructed from conventional chips such as 74193 manufactured by Texas Instruments Corporation while the multiplexer is constructed from a 74S157 chip. As shown, each of the counter circuits 207-72 and 207-74 are connected to receive a portion of memory address bits (i.e., BSAD19, BSAD20 and BSAD21) of a memory command address of a memory read request which define the starting pair of locations of the first word pair to be transferred to the requesting unit by memory controller 200. Each of the counters 207-72 and 207-74 are loaded with new address information in response to a signal from queue control section 215 indicating that the queue address section associated therewith is not full (i.e., a counter is loaded when either signal Q1FULL010 or Q2FULL010 is a binary ZERO).

When controller 200 is conditioned to operate in a burst mode, each counter is incremented by one in response to a signal (i.e., signal UPCNQ1000 or UPCNQ2000) from section 215 upon completion of the transfer of a word pair to bus 10 from the left most sections of data registers 206-8 and 206-10.

When one of the counters 207-72 or 207-74 has been incremented to a maximum count of 8 indicative of completion of burst command, execution by the memory controller 200, the counter forces a carry output signal (signal BMOLQ1000 or BMOLQ2000) to a binary ZERO which is used to reset a burst command mode flip-flop of section 215 to a binary ZERO.

The outputs of the counters 207-72 and 207-74 are applied to different input terminals of multiplexer circuit 207-76. The circuit 207-76 in accordance with the state of signal Q2TRST000 applies the appropriate set of address signals to section 207-40. More specifically, when signal Q2TRST000 is a binary ZERO, the multiplexer 207-76 selects as an address source, the queue counter 207-72. When signal Q2TRST000 is a binary ONE, the multiplexer selects queue counter 207-74 as the address source.

The queue address register section 207-80 as shown in FIG. 4 receives the bus address signals BSAD05110 through BSAD18110, BSAD6X010 and BSAD22110 are applied via the receiver circuits of block 213 of FIG. 3 as inputs to different stages of queue 1 address registers 207-82 and 207-84 and queue 2 address registers 207-86 and 207-88. Additionally, queue 1 address register 207-84 and queue 2 address register 207-88 receive signal BSADX6010 from section 207-1. The enabling gate input terminals of registers 207-82 and 207-84 are connected to receive queue 1 signal Q1FULL000 from section 215. The enabling gate input terminals of registers 207-86 and 207-88 are connected to receive queue 2 signal Q2FULL000 from section 215. The OC input terminals of registers 207-82 and 207-84 are connected to receive signal Q2TRST000 while the OC input terminals of registers 207-86 and 207-88 are connected to receive signal Q1TRST010.

Each of the registers 207-82 through 207-88 are constructed from D-type transparent latch circuits such as those designated as SN74S373 previously discussed. As seen from FIG. 4, the different address output terminals of the registers 207-82 and 207-86 and 207-84 and 207-88 are connected in common in a wired OR arrangement for enabling the interleaving of memory request addresses. Such interleaving is accomplished by controlling the states of the signals applied to the output control (OC) input terminals and the gate or clocking (G) input terminals of the registers 207-82 through 207-88. The output control (OC) terminals enable so-called tristate operation. That is, when either signal Q2TRST000 or signal Q1TRST010 is in a binary ONE state, this inhibits any memory request address signals from being applied to the Q output terminals of that register.

Read/Write Control Section 208

Figure 6:
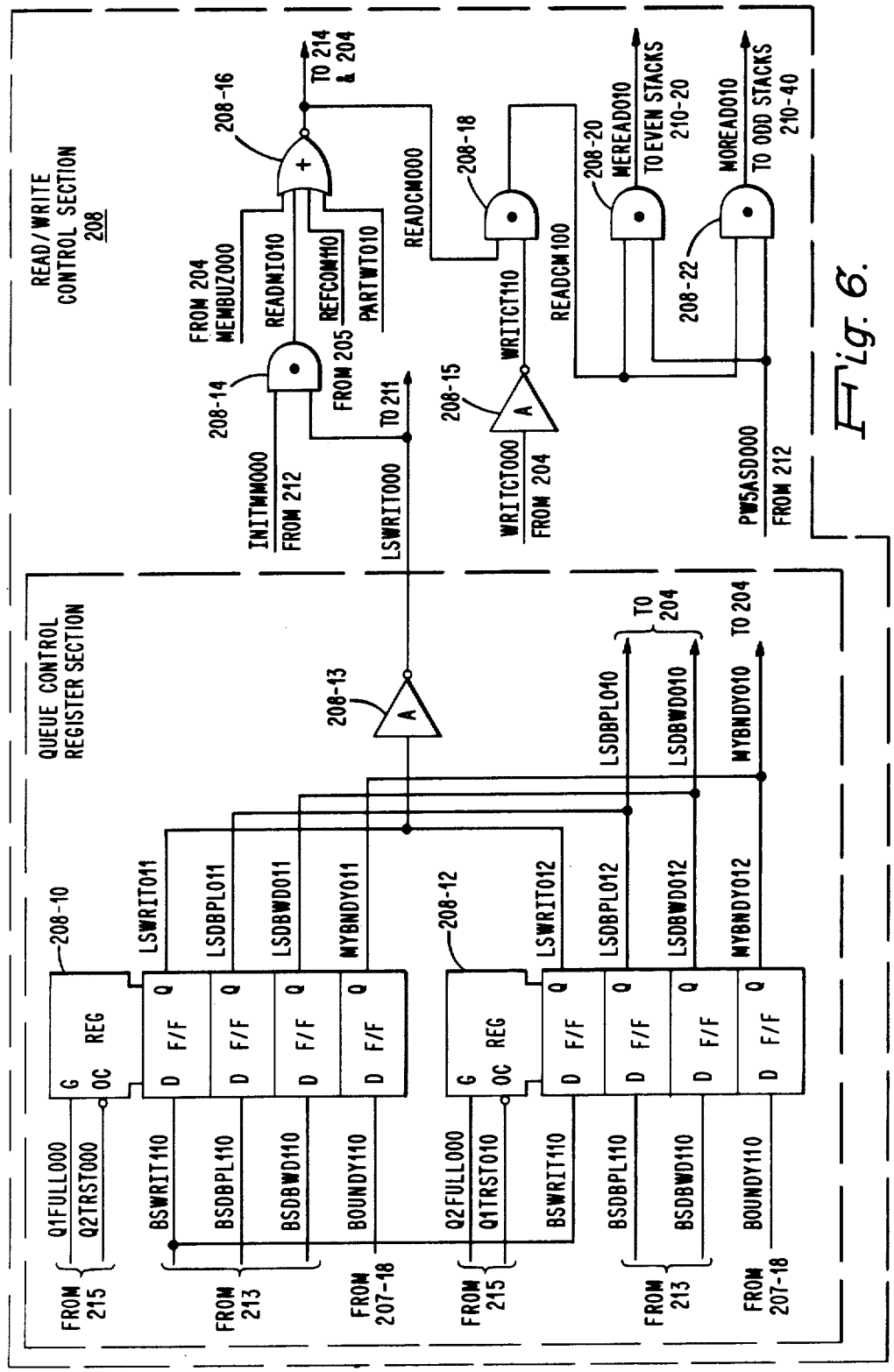

A portion of the circuits of section 208 is shown in greater detail in FIG. 6. As shown, the section 208 includes a pair of registers 208-10 and 208-12 in addition circuits 208-13 through 208-22. Each of the registers 208-10 and 208-12 is constructed from D-type transparent latch circuits designated as SN74S373 and store signals BSWRIT110, BSDBPL110, BSDBWD110 and BOUNDY110. The signal BSWRIT110 is representative of a read/write command while signals BSDBPL110 and BSDBWB110 define different modes of operation for controller 200 (e.g. burst mode, double wide mode, double pull mode). These signals are latched in registers 208-10 and 208-12 when signal Q1FULL000 or Q2FULL000 from section 215 switches to a binary ONE. As seen from FIG. 6, the output terminals of registers 208-10 and 208-12 are connected in common in a wired OR arrangement, enabling the multiplexing or interleaving of memory commands. The signals Q1TRST010 and Q2TRST000 enable the tristate operation of registers 208-10 and 208-12 as discussed relative to section 207-80.

The write mode signal LSWRIT010 is applied to section 211. A read mode signal LSWRIT000 is generated by an inverter circuit 208-13 and applied to an AND gate 208-14 which also receives an initialize signal INITMM000 from section 212.

The AND gate 208-14 in response to a read command (i.e., signal READMM010 is a binary ONE) when the system is not being initialized forces signal READMI010 to a binary ONE. When signal READMI010 is a binary ONE, this causes a NOR gate 208-16 to force a read command signal READCM000 to a binary ZERO. An AND gate 208-18 in response to signal READCM000 forces signal READCM100 to a binary ZERO. A pair of AND gates 208-20 and 208-22 force signals MEREAD010 and MOREAD010 to binary ZEROS. These signals are applied to the read/write control lines of the even and odd stack units 210-20 and 210-40. However, the signals are inverted by circuits included with units 210-20 and 210-40 as shown in FIG. 9 before being applied to the chips which comprise such units.

Another one of the input signals to NOR gate 208-16 is partial write signal PARTWT010. As discussed in U.S. Pat. No. 4,185,323, there are certain types of memory operations such as byte write and initialize operations which require two cycles of operation. As mentioned, in the case of an initialize operation, signal INITMM000 is forced to a binary ZERO. This is effected to override the command applied to the bus. The read/write command signals MEREAD010 and MOREAD010 applied to the stack units 210-20 and 210-40 are generated as a function of signal PARTW010. Signal PARTWT010 when forced to a binary ONE remains a binary ONE until the end of the first cycle and initiates a second cycle operation during which another set of timing signals identical to the first are generated by the circuits of section 204. During the first cycle, the read/write command signals are forced to binary ZEROS and during the second cycle, the signals are forced to binary ONES.

The other signals MEMBUZ000 and REFCOM110 applied to NOR gate 208-16 are forced to binary ONES prior to the start of a memory cycle of operation and during a refresh cycle respectively. It will be noted from FIG. 6 that during a write cycle of operation when signal WRITCT000 is forced to a binary ZERO by the circuits of section 204, signal WRITCT110 generated by an inverter circuit 208-15 causes AND gate 208-18 to switch signal READCM100 to a binary ONE. This in turn causes AND gates 208-20 and 208-22 to force signals MEREAD010 and MOREAD010 to binary ONES indicating that the stack units 210-20 and 210-40 are to perform a write cycle of operation. At this time, a power on signal PW5ASD000 from section 212 is normally a binary ONE.

Queue Control Section 215

As seen from FIG. 7, section 215 includes the number of queue logic circuits of block 215-1, the number of burst mode logic circuits of block 215-6 and the boundary detection and signalling circuits of block 215-11. The circuits of block 215-1 include a Q1 full flip-flop 215-10 having an input NAND gate 215-12 and an output inverter circuit 215-14, an arbitrator flip-flop 215-18 having an inverter circuit 215-20, a NAND gate 215-22 and an AND gate 215-24 and a Q2 full flip-flop 215-26 having input NAND gate 215-28 and AND gate 215-30.

Additionally, section 215-1 includes a Q1, Q2 tristate control flip-flop 215-32 having a plurality of input NAND gates 215-34, 215-36 and 215-38 and an exclusive OR gate 215-40, a Q1 cycle flip-flop 215-45 having an input NAND gate 215-42 and a Q2 cycle flip-flop 215-44 having an input NAND gate 215-46 and a NOR gate 215-48. Both the Q1 and Q2 cycle flip-flops 215-45 and 215-44 connect to an output AND gate 215-50 and series connected 60 nanosecond delay line 215-52. All flips-flops are constructed from D-type flip-flops such as those designated 74S74 manufactured by Texas Instruments Corporation.

The output signals generated by the Q1 full flip-flop 215-10 and Q2 full flip-flop 215-26 are used to clock address and data signals into different ones of the queue registers of sections 206, 207-7 and 208. The Q1 full and Q2 full flip-flops 215-10 and 215-26 are set to a binary ONE state when controller 200 accepts a memory request indicated by signal MYACKR010 being forced to a binary ONE. This occurs as a function of the state of arbitrator flip-flop 215-18. When the controller control logic circuits of section 215-1 are initialized, arbitrator flip-flop 215-18 is switched to a binary ONE via signal BSMCLR200. Signals Q1FULL000 and Q2FULL000 are forced to binary ONES in response to signal QRREST000 which is generated by signals BSMCLR200 and INITMM100. The first MYACKR100 signal switches the Q1 full flip-flop 215-10 from a binary ZERO to a binary ONE. From this point on, the Q1 full and Q2 full flip-flops 215-10 and 215-26 are enabled for alternate switching by signals ARBTQ1010 and ARBTQ2000 generated by arbitrator flip-flop 215-18. The Q1 and Q2 full flip-flops 215-10 and 215-26 switch on during the leading edge of signal MYACKR010 and switch state again upon the trailing edge of cycle signals Q1CYCL000 and Q2CYCL000. The arbitrator flip-flop 215-18 switches its state on the trailing edge of signal MYACKR010.

The above switching of Q1 and Q2 full flip-flops 215-10 and 215-26 assumes that the signals Q1BURS010 and Q2BURS010 applied to the D input terminals are binary ZEROS. Whenever signal Q1BURS010 or Q2BURS010 is a binary ONE indicating that the queue is processing a burst request, the queue flip-flop associated therewith is inhibited from resetting.

The state of Q1, Q2 tristate control flip-flop 215-32 indicates which queue is active (i.e., controls the outputs of the queue registers of sections 206, 207-7 and 208). It is initially set to a binary ONE state when signal QRREST000 is switched to a binary ZERO upon a change in state in signal Q1Q2CY000. This occurs when both cycle flip-flops 215-40 and 215-44 are switched to binary ZEROS bia bus clear signal BSMCLR200. Thereafter, Q1, Q2 tristate control flip-flop 215-32 switches state as an exclusive OR logic function of signals Q2INVT010 and Q2TRST000 at the end of a Q1 or Q2 cycle defined by signal Q1Q2CY000. Signal Q2INVT010 when switched to a binary ONE causes flip-flop 215-32 to remain in a binary ONE only when signal Q2TRST000 is a binary ZERO. However, if signal Q2TRST000 is a binary ONE, flip-flop 215-32 remains in a binary ZERO state. Signal Q2INVT010 is forced to a binary ONE state whenever one of the queues is operating in a burst mode while the other queue is empty.

The states of the Q1 and Q2 cycle flip-flops 215-45 and 215-44 indicate when a particular queue is active (i.e., performing a memory cycle of operation). The setting of these flip-flops occurs as a result of two functions. One is the state or activity of the Q1 and Q2 full signals and the states of the Q1, Q2 tristate signals. When signal Q1TRST010 is a binary ONE indicating that queue 1 is active, signal MPULSE010, generated at the start of the delay line timing circuits 204, switches the Q1 cycle flip-flop 215-40 to a binary ONE at the leading edge of memory busy signal MEMBUZ000. The Q1 cycle flip-flop 215-45 is reset to a binary ZERO at the trailing edge of signal MEMBUZ000. As explained herein, the memory busy signal MEMBUZ000 is generated as a function of the input signals to the delay line circuits 204 and the bus signals, in particular, signal MYDCNN000. Accordingly, once a queue memory cycle of operation is started, it is terminated by a fixed timing pulse in the case of a memory write cycle or it is terminated at the trailing edge of the signal MYDCNN000 in the case of a memory read cycle.

If neither queue is operating in a burst mode, NAND gate 215-38 forces signal Q2INVT010 to a binary ZERO. Signal Q2INVT010 when a binary ZERO causes Q1, Q2 tristate control flip-flop 215-32 to alternate states at the end of an active cycle.

The Q2 cycle flip-flop 215-44 is set and reset in a similar fashion. The positive going edge of signal Q1CYCL000 or signal Q2CYCL000 indicates the end of a queue 1 cycle or Q2 cycle respectively. These signals are used to reset the Q1 full and Q2 full flip-flops 215-10 and 215-26, to condition the delay line restart circuits 204 causing the delay line timing circuits to start another cycle of operation, and to update the state of Q1, Q2 tristate control flip-flop 215-32 via signal Q1Q2CY000. As seen from FIG. 7, signal CYCINH000 inhibits the switching of the Q1 and Q2 cycle flip-flops 215-45 and 215-44 during refresh commands (i.e., when signal REFCOM110 is a binary ONE).

The signal Q1Q2CY000 generated from the binary ZERO outputs of Q1 and Q2 cycle flip-flops 215-45 and 215-44 is delayed and applied to the restart circuits of section 204. Section 215-6 receives Q1 and Q2 cycle signals Q1CYCL010 and Q2CYCL010 in addition to signals Q1FULL010 and Q2FULL010. As shown, section 215-6 includes a Q1 burst mode flip-flop 215-60 and a Q2 burst mode flip-flop 215-62.

The Q1 burst mode flip-flop 215-60 includes a plurality of input AND gates 215-61 through 215-64, a plurality of inverter circuits 215-65 through 215-68 and NOR gates 215-69 and 215-79. These circuits are connected to force burst mode signal BURSCM110 to a binary ONE upon detection of receipt of a burst command signal from bus 10 (i.e., signal BSDBPL100 is a binary ZERO and signal BSDBWD110 is a binary ONE) when the memory command specifies a read operation (i.e., signal BSWRIT200 is a binary ONE). This switches flip-flop 215-60 to a binary ONE when Q1 becomes full (i.e., Q1 full signal Q1FULL010 switches from a binary ZERO to a binary ONE). When any one of the signals BSMCLR310, BMOLQ1010 or NAKRQ21010 is forced to a binary ONE, NOR gate 215-69 resets Q1 burst mode flip-flop 215-60 to a binary ZERO by forcing signal RESQ1B000 to a binary ZERO. Signal NAKRQ1010 is forced to a binary ONE by AND gate 215-64 in response to a negative acknowledgement (i.e., signal BSNAKR010 is a binary ONE) during a Q1 cycle (i.e., signal Q1CYCL010 is a binary ONE) upon the occurrence of bus signal MYDCNN210 from section 211. Signal BMOLQ1010 is forced to a binary ONE upon receipt of a counter carry out signal BMOLQ1000 from section 207-70.

The Q2 burst mode flip-flop 215-62 receives burst mode signal BURSCM110 from AND gate 215-63 and a reset signal RESQ2B000 generated by an input NOR gate 215-79, an AND gate 215-74 and an inverter circuit 215-78. As seen from FIG. 7, the Q2 burst mode flip-flop 215-62 is switched to a binary ONE in response to signal BURSCM110 when Q2 full signal Q2FULL010 switches from a binary ZERO to a binary ONE. It is reset to a binary ZERO when NOR gate 215-79 switches signal RESQ2B000 to a binary ZERO. This occurs in response to a carry out signal BMOLQ2000 from section 207-70, a negative acknowledgement signal NAKRQ2010 or a bus clear signal BSMCLR310.

The binary ONE outputs from the Q1 and Q2 burst mode flip-flops 215-60 and 215-62 in addition to being applied to section 215-1 are applied to output AND gates 215-80 and 215-82. The AND gate 215-80 generates Q1 up counter signal UPCNQ1000 during a burst mode operation (i.e., signal Q1BURS010 is a binary ONE) of a Q1 cycle (i.e., signal Q1CYCL010 is a binary ONE) in response to bus signal MYDCNN210. In a similar fashion, AND gate 215-82 generates Q2 up counter signal UPCNQ2000. These signals are applied to a corresponding one of the queue counters of section 207-70. The signals are also applied to an OR gate 215-84 for generation of a double wide response signal DWRESP110 which is applied to the line BSDBPL via a driver circuit of section 213. Signal DWRESP110 is forced to a binary ONE when the controller 200 is in a burst mode operation during a queue cycle of operation upon the generation of bus response signal MYDCNN210 by the circuits of section 213. This signal indicates whether or not additional responses (i.e., additional data transfers) are to follow when the controller 200 is operating in a burst mode.

In accordance with the principles of the present invention, section 215-11 includes a pair of flip-flops 215-100 and 215-102 having input circuits which include inverter circuits 215-102 and 215-104, NAND gates 215-106 and 215-108 and AND gates 215-110 and 215-112. The binary ONE outputs are inverted by inverter circuits 215-114 and 215-116 and applied as inputs to an AND gate 215-118. The gate 215-118 receives a boundary condition signal MYBNDY010 from section 207 and generates signal MYBNDY110 which is applied to the line BSDBWD via one of the driver circuits of block 213 which also is connected to receive signal MYDCNN100.

When signal BMOLQ1000 or BMOLQ2000 switches to a binary ZERO, this causes a corresponding one of the flip-flops 215-100 or 215-102 to switch to a binary ONE state when bit 22 has a binary ONE value. The states of signals Q1FULL000 and Q2FULL000 establish whether or not the flip-flop is enabled for switching. That is, signal Q1FULL000 or Q2FU11000 is a binary ZERO when the queue 1 and queue 2 circuits are performing cycles of operation respectively. Thus, when signal Q1FULL000 is a binary ZERO, NAND gate 215-106 forces its output to a binary ONE. This causes AND gate 215-110 to force its output to a binary ONE so as to prevent the resetting of flip-flop 215-100 to a binary ZERO. However, when signal Q1FULL000 is forced to a binary ONE or signal QRREST000 is forced to a binary ZERO, AND gate 215-110 forces its output to a binary ZERO. This clears flip-flop 215-100 to a binary ZERO. Flip-flop 215-102 is set and reset in a similar fashion.

Bus Control Section 211

Figure 8:
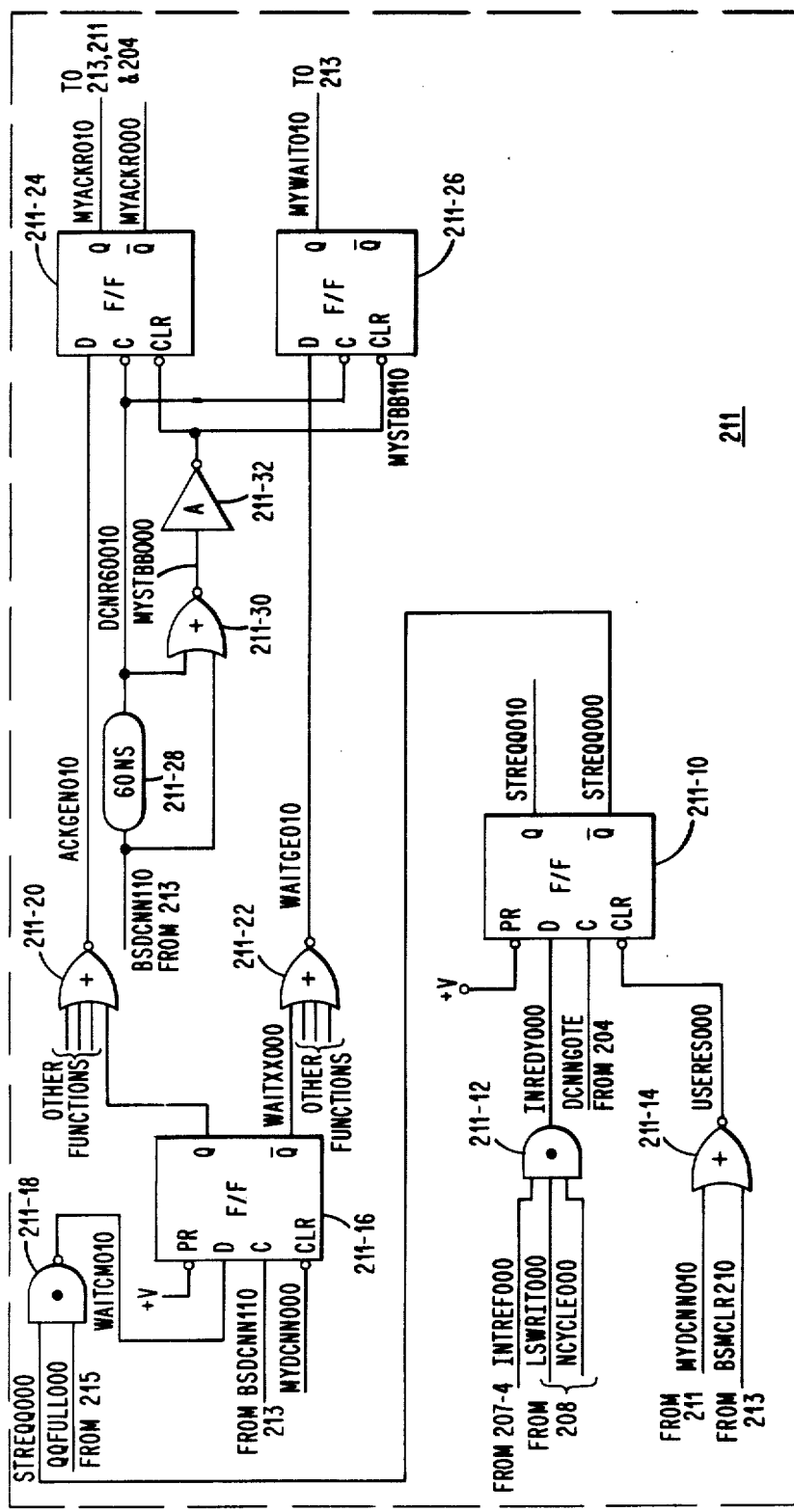

A portion of the circuits of section 211 is shown in FIG. 8. These circuits generate the memory acknowledgement and memory wait response signals MYACKR010 and MYWAIT010 which are applied to bus 10 via section 213.

Before describing these circuits, a brief explanation of the operation of the bus circuits of section 211 will be given. These circuits are described in detail in the previously referenced patent application of John L. Curley, et al. The section 211, as other units which connect to bus 10, include a user flip-flop (not shown) which connects to a request flip-flop (not shown). The circuits shown in FIG. 8 provide an output to user flip-flop, in addition to the bus line BSDBPL via the circuits of block 213.

When a timing signal from the timing generator circuits of section 204 switches from a binary ZERO to a binary ONE, the user flip-flop is switched to a binary ONE when the memory accepts a request and is not performing a refresh cycle. The stored request signal is applied to the input of a request flip-flop, not shown. When this flip-flop is switched to a binary ONE, its output is applied to the bus tie breaking network in addition to the bus driver/receiver circuits of block 213 whereupon it is inverted and is applied to bus line BSREQT. When line BSREQT is forced to a binary ZERO, it prevents any other stored requests of other units from setting their corresponding request flip-flops. Since the memory subsystem 20 has the highest priority, this results in the switching of a grant flip-flop to a binary ONE. This results in signal MYDCNN010 being switched to a binary ONE. The signal MYDCNN010 is inverted by the driver/receiver circuits of block 213 and is applied to line BSDCNN.

Now referring to FIG. 8, it is seen that the circuits include a storage request flip-flop 211-10 having associated input AND gate 211-12 and NOR gate 211-14 circuits, a wait flip-flop 211-16 having an input NAND gate 211-18 and a pair of output NOR gates 211-20 and 211-22 and a pair of memory response flip-flops 211-24 and 211-26 having input circuits which include a 60 nanosecond delay circuit 211-28, a NOR circuit 211-30 and inverter circuit 211-32. The D-type flip-flops 211-10 and 211-16 are constructed from 74S74 chip circuits while the D-type flip-flops 211-24 and 211-26 are constructed from 74S175 chip circuits.

The store request flip-flop 211-10 switches to a binary ONE in the absence of a refresh cycle and when the controller 200 is not being initialized (i.e., when signal INTREF000 is a binary ONE) in response to a memory read request (i.e., signal LSWRIT000 is a binary ONE). Signal NCYCLE000 can be assumed to be a binary ONE. Switching occurs when timing signal DCNNGOTE from secton 204 switches from a binary ONE to a binary ZERO. The flip-flop 211-10 is reset to a binary ZERO via NOR gate 211-14 upon the generation of memory bus response signal MYDCNN010 or bus clear signal BSMCLR210.

The wait flip-flop 211-16 is set to a binary ONE in response to a wait command signal WAITCM010 upon the occurrence of bus signal BSDCNN110. Wait command signal WAITCM010 is generated when there is either a stored request (i.e., signal STREQQ000 is a binary ZERO) or both queues are full (i.e., signal QQFULL000 is a binary ZERO). The generation of bus signal MYDCNN000 resets wait flip-flop 211-16 to a binary ZERO.

The state of wait flip-flop 211-16 along with other functions (not shown) determine the type of response generated by controller 200. In the case of a wait condition, signal WAITXX010 inhibits memory acknowledge response flip-flop 211-24 from switching to a binary ZERO state while signal WAITXX000 switches memory wait response flip-flop 211-26 to a binary ONE state. Switching occurs 60 nanoseconds following the generation of bus response signal BSDCNN110. In the absence of a wait condition, signals WAITXX010 and WAITXX000 switch flip-flops 211-24 and 211-26 to a binary ONE and to a binary ZERO, respectively.

Both flip-flops are reset to binary ZEROS following the generation of signals BSDCNN110 and DCNR60010 (i.e., when signal MYSTBB110 is a binary ZERO) on the trailing edge of bus response signal BSDCNN110.

Memory Units 210-20 and 210-40—FIG. 9

As previously discussed, the even word and odd word stacks of blocks 210-20 and 210-40 are shown in greater detail in FIG. 9. These stacks include four rows of 22 64K × 1-bit RAM chips as shown. Each 64K chip includes two 32,768 bit storage arrays. Each array is organized into a 128 row by 256 column matrix and connects to a set of 256 sense amplifiers. It will be appreciated that other 64K chip organizations may also be utilized. The chips and associated gating circuits are mounted on a daughter board. Each daughter board includes 2 inverters (e.g. 210-203, 210-207) which are connected to receive a corresponding one of the read/write command signals from section 208 and four, 2 input NAND gates (e.g. 210-200 through 210-206 and 210-400 through 210-406) which are connected to receive the row and column timing signals from section 204 and the row decode signals from section 207. Only those chip terminals pertinent to an understanding of the present invention are shown. The remaining terminals, not shown, are connected in a conventional manner. For further information, reference may be made to the copending patent application "Rotating Chip Selection Technique and Apparatus", invented by Chester M. Nibby, Jr. and William Panepinto, Jr., Ser. No. 921,292, filed on July 3, 1978, now U.S. Pat. No. 4,296,467 and assigned to the same assignee as name herein.

DESCRIPTION OF OPERATION

The operation of controller 200 in processing memory burst command requests in accordance with the teachings of the present invention will now be described with reference to FIGS. 1 through 9 and the address format of FIG. 10 and the timing diagram of FIG. 11.

It will be assumed that the disk controller 50 generates a memory read request including an address coded to specify controller 200 with address bits BSAD19-21 set to binary ZEROS and address bit BSAD22 set to a binary ONE. Also, for the request, disk controller 50 operates to switch line BSDBPL to a binary ZERO, line BSDBWD to a binary ONE and line BSWRIT to a binary ZERO indicating that the memory request is a burst command request.

Figure 10:
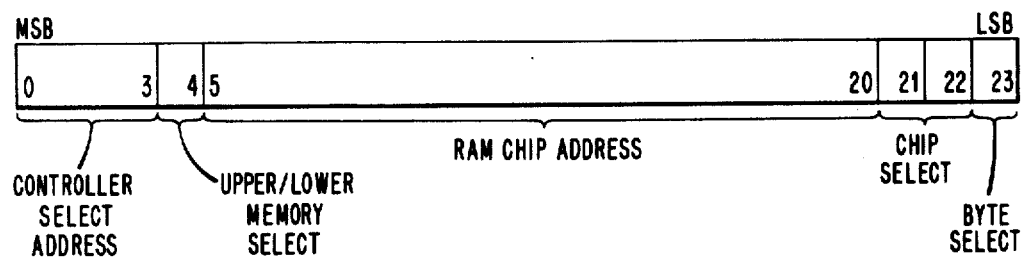
FIG. 10 shows the form of the address of a memory request applied to the memory subsystem 20 of FIG. 1.

FIG. 10 illustrates the format of the memory read request addresses applied to the memory controller. The high order/most significant bit positions are coded to identify the memory module/controller to process the request. Address bit 4 is used to select which 256K half (i.e., upper or lower half) of controller memory is being accessed. These address bits are processed by the circuits of controller 200 and are not provided to the RAM chips.

Figure 11:
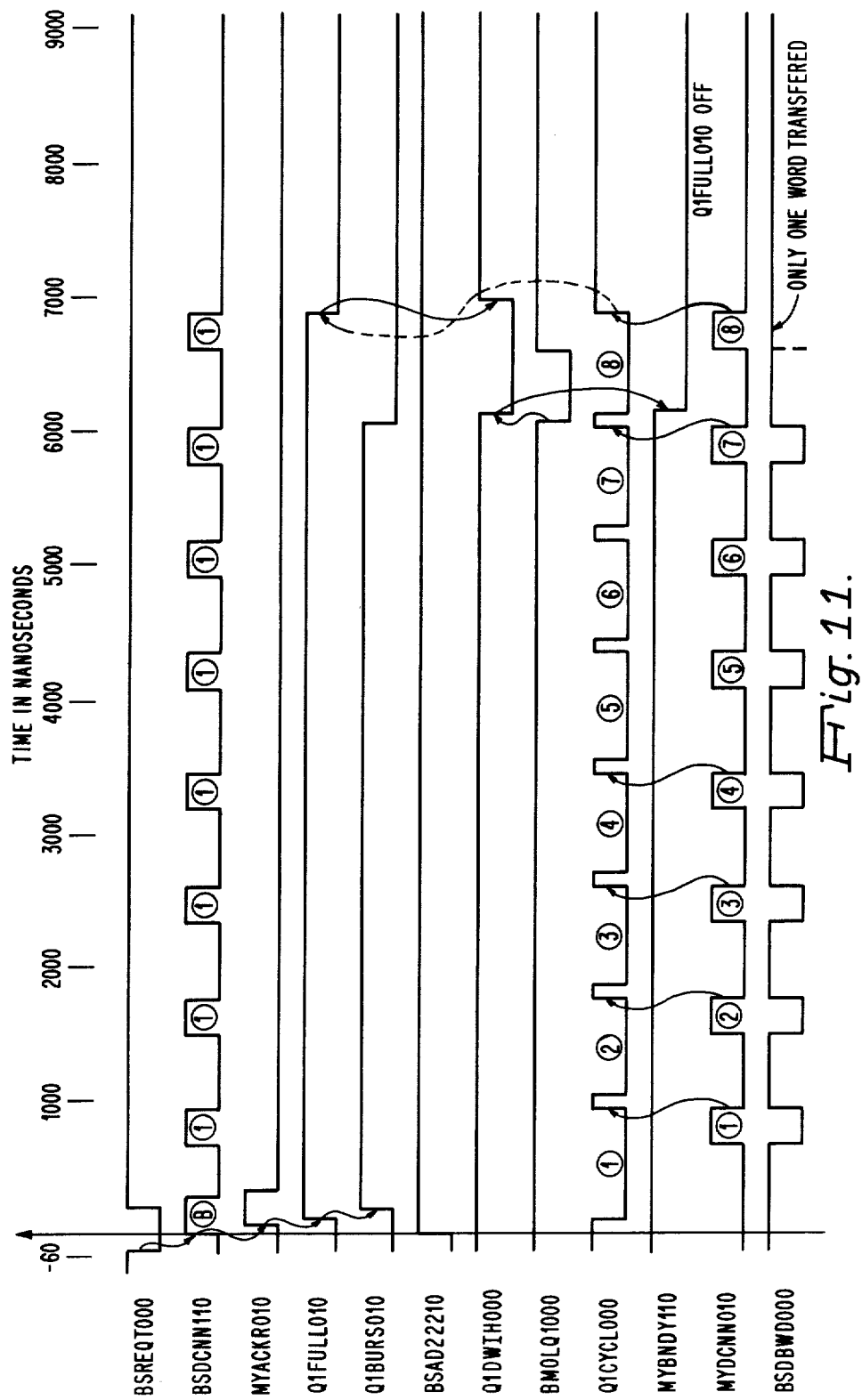
FIG. 11 is a timing diagram used in describing the operation of the controller apparatus of the present invention.

Now, referring to FIG. 11, it is seen that the first bus request (i.e., signal BSREQT000) causes the generation of bus signal BSDCNN110 by the requestor. Bus circuits 211 generate signal BSDCNN110 when controller 200 has been granted access to bus 10. The controller will switch MYACKR flip-flop 211-24 of FIG. 8 to a binary ONE, 60 nanoseconds after the leading edge of a requestor generated bus signal BSDCNN110. Setting occurs because wait flip-flop 211-16 is in a binary ZERO state (i.e., there is no request stored-signal STREQQ000 is a binary ONE and both queues are not full-signal QQFULL000 is a binary ONE).

The switching of MYACKR flip-flop 211-24 to a binary ONE causes Q1 full flip-flop 215-10 of FIG. 7 to switch to a binary ONE on the positive going leading edge of signal MYACKR010. At this time, arbitrator flip-flop 215-18 is initially in a binary ONE state. Such switching forces signal Q1FULL010 to a binary ONE which, in turn, causes Q1 burst mode flip-flop 215-60 to switch to a binary ONE. In greater detail, AND gate 215-63 is conditioned by the binary ONE states of signals BURSCM010 and BSWRIT200 to force burst mode signal BURSCM110 to a binary ONE. This switches Q1 burst mode flip-flop 215-60 to a binary ONE on the positive going transition of signal Q1FULL010.

The Q1 full signal Q1FULL010 loads signals representative of memory address bits 19-21 of the first memory request into Q1 counter 207-72 of FIG. 4. The remaining address bits 22 and 5-18 are loaded into queue 1 address registers 207-82 and 207-84 of FIG. 4 together with the state of signal BSADX6010. Additionally, Q1 full signal Q1FULL010 loads the states of control lines BSWRIT, BSDBPL and BSDBWD corresponding to signals BSWRIT110, BSDBPL110 and BSDBWD110 into the Q1 command control register 208-10 of FIG. 6.

At the same time, the state of boundary address signal BOUNDY110 from section 207 also is loaded into register 208-10. It is assumed that the memory request address is not indicative of an actual boundary address condition (i.e., word 63 or modulo 63 value). Since the subsequent memory addresses are generated by controller 200, signal BOUNDY110 is not used in detecting further occurrences of address boundary conditions. In accordance with the teachings of the present invention, it is queue 1 address counter 207-72 and queue 2 address counter 207-74 and the circuits 215-100 through 215-118 which detect and signal the requestor of the existence of an address boundary condition produced by starting the burst operation on an odd word boundary.

The memory acknowledgement signal MYACKR110 also causes the circuits 204 of FIG. 5 to generate delay start signal DLYSTR010 which initiates a memory cycle of operation. That is, since both queues are empty, signal CYCNTL010 is a binary ZERO which causes signal DLYSTR010 to be generated in response to signal MYACKR010. This causes the delay line circuits to generate a sequence of timing signals. As seen from FIG. 5, timing signals DLY180010, DLY260010 and DLYINN010 cause NOR gate 204-52 to force signal MEMCYC000 to a binary ZERO. This results in NOR gate 204-56 forcing signal MEMBUZ000 to a binary ZERO indicating that controller 200 has begun a memory cycle of operation (i.e., memory is busy). Also, signal MPULSE010 generated by AND gate 204-36 causes NAND gate 215-42 of FIG. 7 to switch Q1 cycle flip-flop 215-45 to a binary ONE in accordance with the state of signal Q1TRST010. That is, as seen from FIG. 11, Q1,Q2 tristate control flip-flop 215-32 of FIG. 7 is a binary ONE at this time (i.e., initially forced to a binary ONE by reset signal QRREST000).

The queue address signals applied to the output terminals of Q1 address registers 207-82 and 207-84 of FIG. 4 in response to signal Q2TRST000 (i.e., complement of signal Q1TRST010 of FIG. 11) are transferred into row and column address registers 207-40 and 207-41. Also, signals BSAD20210 and BSAD19210 from Q1 counter 207-72 are loaded into register 207-40.

As seen from FIG. 4, the address signals BSAD21210 and BSAD22210 from sections 207-70 and 207-80 are decoded by one of the decoder circuits 207-20 or 207-31 which are enabled for operation as a function of signals BSADX6210 and BSADX6200, respectively. Assuming decoder circuit 207-20 is enabled, it forces one of the four decode signals to a binary ZERO. This, in turn, conditions a pair of the set of NAND gates 207-24 through 207-30 to force a pair of the RAS decode signals DRAST0010 through DRAST3010 to binary ONES. The timing signals MRASTE010 and MRAST0010 generated by the circuits of section 204 are applied to the rows of RAM chips of FIG. 9. These signals cause the row address signals MADD00010-MADD07010 applied by register 207-40 of FIG. 4 in response to signal MRASCT000 to the A0-A7 terminals of the rows of RAM chips to be stored in the pair of rows selected by the pair of RAS decode signals. The low order 4 row address bits are incremented by adder circuit 207-54 as a function of address bits BSAD21 and BSAD22.

The timing signals MCASTT010 and MCASTS010 generated by the circuits of section 204 store the column address signals MADD00010-MADD07010 applied by register 207-41 in response to signal MCASCT000 to the terminals of all of the rows of RAM chips within stacks 210-20 and 210-40 of FIG. 9.

The memory request stored within the queue 1 control register 208-10 causes the contents of a first pair of storage locations to be read out from the locations specified by queue address registers 207-82 and 207-84 and Q1 counter 207-72. That is, the signal BSWRIT110 causes the circuits 208 of FIG. 6 to force read command signal READCM100 to a binary ZERO. This results in AND gates 208-20 and 208-22 forcing signals MEREAD010 and MOREAD010 to binary ZEROS causing the specified rows of chips to perform a read operation. The pair of words corresponding to words 1 and 2 are loaded into the middle right sections of data registers 206-8 and 206-10 in response to timing signals MDOECT010 and MDOOCT010 generated by section 204.

From there, the pair of words are applied to lines MUXD00-15 and MUXD16-31 of FIG. 3 via the data out multiplexer circuits 206-16 and 206-18 as a function of the state of address bit BSAD22. That is, when signal BSAD22210 is a binary ZERO, the contents of the even data register is applied to lines MUXD00-15 by multiplexer circuit 206-16. The multiplexer circuit 206-18 applies the odd data register contents to lines MUXD15-31. The reverse of this occurs when address bit BSAD22 is a binary ONE.

The transfer of the data occurs during the second half of the bus cycle designated by the "1" portion of second signal BSDCNN110 in FIG. 11. This signal is switched to a binary ONE on the leading edge of signal MYDCNN010. This, in turn, forces line BSDCNN to a binary ONE state signalling the requestor of a bus data cycle.

Signal MYDCNN210 also causes the AND gate 215-80 of FIG. 7 to force signal UPCNQ1000 to a binary ONE. This in turn forces double wide response signal DWRESP110 to a binary ONE. That is, at this time, both the Q1 burst mode flip-flop 215-60 and Q1 cycle flip-flop 215-45 are binary ONES. This response signal when applied to the circuits of block 213 forces line BSDBPL to a binary ONE to signal the memory requestor that more transfers of word pairs are to take place. Additionally, since both flip-flops 215-100 and 215-102 are binary ZEROS, AND gate 215-118 of FIG. 7 forces signal MYBNDY110 to a binary ONE. This signal when inverted by the circuits 213 causes line BSDBWD to be forced to a binary ONE in response to signal MYDCNN010 (i.e., signal BSDBWD000 applied to bus 10 is forced low indicative of a binary ONE). This signals the requestor that the 32-bit two word transfer is valid.

The signal UPCNQ1000 causes the first memory request address contents of Q1 address counter 207-72 to be incremented by one. This enables the next double word of data corresponding to words 3 and 4 to be read out from memory. As seen from FIG. 11, the first queue 1 memory cycle of operation is completed when the trailing edge of the first signal MYDCNN010 switches memory busy signal MEMBUZ000 to a binary ONE. Following that, signal BSDCNN110 switches to a binary ZERO denoting the end of the data cycle. Signal MEMBUZ000 causes Q1 cycle flip-flop 215-45 to switch to a binary ZERO state. In response to such switching, AND gate 215-50 forces signal Q1Q2CY000 from a binary ZERO to a binary ONE. Hence, signal Q1Q2CY000 conforms to signal MEMBUZ000 but is delayed in time. At the positive going transition of signal Q1Q2CY000, Q1,Q2 tristate control flip-flop 215-32 is conditioned to switch state as a function of signal OPOINT010. Since signal QPOINT010 is a binary ONE (i.e., Q2 full flip-flop 215-26 is a binary ZERO), Q1,Q2 tristate control flip-flop 215-32 remains a binary ONE.

Recycle signal RECYCL110 causes the circuits 204 of FIG. 5 to generate a second delay start signal DLYSTR010 for initiating a second queue 1 memory cycle of operation. In greater detail, since both queues are not empty, cycle control flip-flop 204-60 switches signal CYCNTL010 to a binary ONE. This selects recycle signal RECYCL110 which is forced to a binary ONE upon the switching of recycle flip-flop 204-38 to a binary ONE which occurs in response to the positive going transition of signal Q1Q2CY600. As seen from FIG. 7, signal Q1Q2CY600 corresponds to signal Q1Q2CY000 delayed by 60 nanoseconds.

Signal DLYSTR010 causes the delay line circuits to generate the above mentioned sequence of timing signals. Again, NOR gate 204-56 of FIG. 5 is conditioned to switch signal MEMBUZ000 to a binary ZERO indicating that controller 200 has begun another memory cycle of operation (i.e., it is busy). Also, signal MPULSE010, generated by AND gate 204-36, causes NAND gate 215-42 of FIG. 7 to switch Q1 cycle flip-flop 215-45 to a binary ONE in accordance with the state of signal Q1TRST010. That is, as seen from FIGS. 7 and 11, Q1,Q2 tristate control flip-flop 215-32 is still in a binary ONE indicating that queue 1 circuits are to execute the next memory cycle of operation.

Again, the queue address signals applied to the output terminals of Q1 address registers 207-82 and 207-84 of FIG. 4 by signal Q2TRST000 are transferred into row and column address registers 207-40 and 207-41. Also, the incremented signals BSAD20210 and BSAD19210 from Q1 counter 207-72 selected by multiplexer circuit 207-76 are loaded into register 207-40.

In the same manner previously described, incremented signal BSAD21210 from Q1 counter 207-72 and signal BSAD22210 from Q1 register 207-84 are decoded by the circuits of section 207-2 and result in the generation of a pair of RAS decode signals. The timing signals MRASTE010 and MRAST0010 when applied to the pair of rows of RAM chips specified by the RAS decode signals cause the incremented row address signals MADD0010-MADD07010 from register 207-40 to be stored therein.

In a similar fashion, timing signals MCASTT010 and MCASTS010 cause the storage of column address signals MADD00010-MADD07010 from register 207-41 within all of the rows of RAM chips of FIG. 9. The second word pair specified by the address contents of Q1 counter 207-72 are read out in response to signals MEREAD010 and MOREAD010 and loaded into the middle right sections of data registers 206-8 and 206-10 in response to timing signals MDOECT010 and MDOOCT010.

Both words are transferred during the second half of the second bus cycle designated by the "1" portion of third signal BSDCNN110 shown in FIG. 11. Signal BSDCNN110 switches to a binary ONE on the positive going transition of the second signal MYDCNN010. This again forces line BSDCNN to a binary ONE state.

Signal MYDCNN210 also causes AND gate 215-80 of FIG. 7 to force signal UPCNQ1000 to a binary ONE which again forces response signal DWRESP110 to a binary ONE. This, in turn, forces line BSDBPL to a binary ONE again signalling the memory requestor that more transfers of word pairs are to take place. Also, since both flip-flops 215-100 and 215-102 are still binary ZEROS, AND gate 215-118 maintains signal MYBNDY110 in a binary ONE state. This, in turn, switches line BSDBWD to a binary ONE signalling the requestor that both words are valid.

The signal UPCNQ1000 causes Q1 address counter 207-72 to increment its address contents by one enabling read out of the next double word from memory. The queue 1 memory cycle of operation is completed when the trailing edge of the second signal MYDCNN010 switches signal MEMBUZ000 to a binary ONE. This is followed by the switching of signal BSDCNN110 to a binary ZERO.

Signal MEMBUZ000 again resets Q1 cycle flip-flop 215-45 to a binary ZERO. This results in signal Q1Q2CY000 being forced to a binary ONE which again enables Q1,Q2 tristate control flip-flop 215-32 to switch state as a function of signal QPOINT010. Since signal QPOINT010 is a binary ONE, the next memory cycle will be carried out by the queue 1 circuits.

As seen from FIG. 11, during successive queue 1 memory cycles of operation, pairs of double words are read out from memory locations specified by queue 1 address registers 207-82 and 207-84 and Q1 address counter 207-72. At the end of each cycle, the address contents of counter 207-72 are incremented by one and bus response signal DWRESP110 is forced to a binary ONE signalling the memory requestor that the transfer of further pairs of data words is to take place. Also, signal MYBNDY110 is maintained in a binary ONE state for signalling that both words are valid. This forces line BSDBWD to a binary ONE upon the generation of signal MYDCNN010.

The queue 1 double word transfer continues until a predetermined number of words have been transferred. The predetermined number is signalled by the overflow of the address contents of Q1 address counter 207-72.

More specifically, from FIG. 11, it is seen that following the seventh queue 1 cycle defined by signal Q1CYCL010, the Q1 burst mode flip-flop 215-60 is reset to a binary ZERO. That is, at the end of the seventh cycle, queue 1 counter 207-72 is incremented by one to a count of all ones. This causes the counter 207-72 to force borrow signal BMOLQ1000 to a binary ZERO. As seen from FIG. 7, signal BMOLQ1000 causes NOR gate 215-69 to force signal RESQ13000 to a binary ZERO resetting Q1 burst mode flip-flop 215-60 to a binary ZERO. At the same time, signal BMOLQ1000 switches flip-flop 215-100 to a binary ONE state, since address bit 22 is a binary ONE. This, in turn, causes AND gate 215-118 to force signal MYBNDY110 to a binary ZERO.

During the eighth cycle, the last word pair corresponding to words 15 and 16 are read out from the pair of memory locations specified by the all ones first memory request address contents of Q1 counter 207-72 and queue 1 address registers 207-82 and 207-84. However, at the end of the cycle, since signal Q1BURS010 is a binary ZERO, AND gate 215-80 is inhibited from incrementing the all ones contents of counter 207-72 by one. Since signal UPCNQ1000 is a binary ZERO, OR gate 215-84 holds response signal DWRESP110 at a binary ZERO. This, in turn, holds line BSDBPL at a binary ZERO signalling the requestor that no further transfers are to take place. Also, since signal MYBNDY110 is a binary ZERO, line BSDBWD is not forced to a binary ONE when signal MYDCNN010 is generated as shown in FIG. 11. This indicates to the requestor that only the 16 bits of data applied to lines BSDT00-BSDT15 are valid. As discussed above, the word applied to these lines is selected as a function of address bit 22. In this case, the 16 bits correspond to word 15. However, since Q1 address counter 207-72 does not generate the address which enabled the read out of word 16, this could give rise to an address boundary condition. The present invention therefore provides for signalling the requestor that the last word, here word 16, is not valid.

Upon the completion of the transfer operation, each queue is ready to begin another such transfer starting at the address specified by the next received memory request address. It will be appreciated that if the memory request address initially specified that the transfer was to begin at an all ones address, the queue address counter would generate an overflow signal. This would prevent the setting of the burst mode flip-flop associated therewith and the request would be processed as a non-burst request (i.e., only a single word pair would be transferred if no boundary address is detected). Accordingly, if the starting memory request address had a value of three, four word pairs would be transferred, etc. In each case, the invention would signal the requestor that the last word in the case of each odd memory address was invalid due to the exceeding of the address boundary established by the Q1 and Q2 address counters 207-72 and 207-74.

From the above description, it is seen how the apparatus of the present invention is able to efficiently process memory requests involving a predetermined number of word pairs. The apparatus by including at least one memory queue address counter and queue boundary detection and signalling apparatus permits the transfer of word pairs to begin on any word boundary.

It will be appreciated by those skilled in the art that many changes may be made to the illustrated embodiment without departing from the teachings of the present invention. For example, the number of address counters, counter stages or memory module units may be increased or decreased. Also, different types of circuits may be used in the preferred embodiment of the present invention. For example, tristate register circuits could be used in place of the counter circuits included in the control circuits of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory controller for use in a system including at least one request generating unit coupled to a bus in common with said controller, said controller being coupled to at least one memory module including a plurality of word locations and said controller being operative to control the operation of said module in response to memory requests generated by said unit, said memory requests including predetermined types of memory requests, each coded to specify the read out of a number of data words over successive memory cycles of operation by said controller independent of any memory address included within said request and each predetermined type of memory request including a memory address specifying where in said memory module the read out of said words is to begin and said controller comprising:

an address counter circuit coupled to said bus for receiving a predetermined portion of each said memory address and said address counter circuit being operatively coupled to apply address signals to said module for specifying the locations to be addressed within said module during each of said successive memory cycles of operation;

mode control means coupled to said address counter means and to said bus, said mode control means being operative in response to each of said predetermined types of memory requests to switch from a first to a second state independent of said memory address, conditioning said controller for operating in a predetermined mode of operation, said mode control means only when in said second state generating signals for incrementing by one said predetermined portion of said memory address loaded into said address counter circuit by said mode control means in response to said each predetermined type of request after each successive memory cycle of operation enabling the read out of successive words from consecutive number of locations of said memory module; and, address boundary detection and signalling means coupled to said address counter circuit and to said bus for receiving another predetermined portion of said memory address, and said address counter circuit upon being incremented to a predetermined count generating an output signal indicating the termination of said predetermined mode of operation, said address boundary detection and signalling means being operative in response to said output signal to generate a response signal on said bus in accordance with said another predetermined portion of said memory address, indicating to said unit whether or not said predetermined count exceeded an address boundary defined by said predetermined type of request and said mode control means in response to said output signal being operative to switch from said second state to said first state enabling said controller to accept another predetermined type of memory request specifying said read out of said words to begin on any word boundary.

2. The controller of claim 1 wherein said controller includes address register means coupled to said bus for storing a signal corresponding to said another predetermined portion of said memory address representative of the least significant address bit of said memory address and wherein said address boundary detection and signalling means includes boundary bistable means coupled to said address counter circuit, to said address register means and to said bus, said boundary bistable means being operative in response to said output signal to selectively switch from a first state to a second state generating said response signal in accordance with the state of said least significant address bit.

3. The controller of claim 2 wherein said controller further includes:

timing means coupled to said bus for selectively generating predetermined sequences of timing signals in response to each memory request for performing a memory cycle of operation within said memory module and said timing means being coupled to said mode control means, said mode control means conditioning said timing means to generate successive predetermined sequences of said timing signals for enabling said controller to carry out said successive memory cycles of operation for read out of said consecutive words from said number of locations specified by said address counter circuit during the execution of said each predetermined type of request.

4. The controller of claim 3 wherein said address counter circuit includes a plurality of bistable stages corresponding in number sufficient to define a maximum number of words to be read out from said memory module in response to said each predetermined type of memory request.

5. The controller of claim 4 wherein said predetermined address portion of each said predetermined type of memory request is coded to specify that said predetermined type of memory operation is to start at any word address location.

6. The controller of claim 5 wherein said mode control means includes decode gating means coupled to said bus and mode bistable means coupled to said decode gating means, said bus including a plurality of control lines for applying coded signals to said decode gating means specifying said predetermined type of memory operation, said decode gating means being conditioned by said coded signals to generate an output signal for switching said mode bistable means from said first to said second state.

7. The controller of claim 6 wherein a first of said control lines is coded to indicate when a bus double wide memory operation is to take place, a second one of said control lines is coded to indicate when a bus double word pull operation is to take place, and a third one of said control lines is coded to indicate when a write cycle of operation is to take place.

8. The controller of claim 7 wherein said first through third ones of said control lines are coded to have the value "100" specifying that the operation is a double wide memory operation and not a double word pull operation and that the controller is to perform a read operation.

9. The controller of claim 6 wherein said boundary bistable means couples to a first one of said control lines coded to indicate when a bus double wide memory operation is to take place, said boundary bistable means switching to said second state when said least significant address bit is a binary one indicating that said predetermined type of memory operation is to begin at an odd word address and said boundary bistable means when switched to said second state forcing said first one of said lines to a predetermined state indicating that a last word read out from said module is not valid.

10. The controller of claim 6 wherein said mode control means further includes increment circuit gating means coupled to said mode bistable means, to said bus and to said address counter circuit, said increment circuit gating means being operative to generate an increment signal at the end of each memory cycle of said predetermined type of memory operation upon the application of each word pair to said bus when said mode bistable means is in said second state.

11. The controller of claim 10 wherein said mode control means further includes response generating means coupled to said increment circuit gating means and to a second one of said control lines coded to indicate when a bus double word pull operation is to take place, said response generating means being operative in response to said increment signal to switch said second one of said control lines to a predetermined state for signalling that further transfers of words are to take place when said controller is in said predetermined mode of operation.

12. The controller of claim 6 wherein said mode control means further includes:
request indicator means coupled to said mode bistable means and to said bus, said request indicator means being switched to a predetermined state in response to each predetermined type of request only when said mode bistable means is in said first state and said request indicator means when switched to said predetermined state enabling said mode bistable means to switch to said second state in response to said each predetermined type of request and said address counter to be loaded with said predetermined address portion.

13. A memory controller for use in a system including at least one request generating unit coupled to a bus in common with said controller, said controller being coupled to a plurality of memory modules, each module including a plurality of word locations and said controller being operative to control the operation of said modules in response to memory requests generated by said unit, said memory request including predetermined types of memory requests, each coded to specify the read out of predetermined numbers of data words over successive memory cycles of operation by said controller independent of any memory address included within said request and each predetermined type of memory request including a memory address specifying where in said memory modules the read out of said words is to begin, said controller comprising:
a plurality of address counter circuits, each address counter circuit being coupled to said bus for receiving a predetermined portion of a different one of said memory addresses and each address counter circuit being operatively coupled to apply address signals to said number of modules for specifying a plurality of locations to be addressed during each of said successive memory cycles of operation;
mode control means coupled to said plurality of address counter circuits and to said bus, said mode control means being operative in response to each of said predetermined types of memory request to load said predetermined portion of said memory address into an available one of said plurality of address counter circuits and for switching from a first state to a second state independent of said memory address, placing said controller in a predetermined mode of operation, said mode control means only when in said second state generating signals for incrementing by one said predetermined portion of said memory address the contents of one of said plurality of address counter circuits after each memory cycle of operation of said predetermined type of request enabling the read out of successive pluralities of words from consecutive pairs of locations in said number of memory modules to said bus;
address boundary detection and signalling means coupled to said plurality of address counter circuits and to said bus for receiving another predetermined portion of said memory address; and,
said one address counter circuit upon being incremented to a predetermined count generating an output signal indicating the read out of a last word pair, said address boundary detection and signalling means being operative in response to said output signal to generate a response signal to said bus in accordance with said another predetermined portion of said memory address, indicating to said unit whether or not said predetermined count exceeded an address boundary defined by said predetermined type of request and said mode control means switching from said second state to said first state in response to said output signal indicative of the availability of said one address counter circuit and the readiness of said controller to accept another predetermined type of memory request specifying said read out of successive pluralities of said words to begin on and word boundary.

14. The controller of claim 13 wherein said controller includes an address register coupled to said bus for storing a signal corresponding to said another predetermined portion of said memory address representative of the least significant address bit of said memory address and wherein said address boundary detection and signalling means includes:
a plurality of boundary bistable means corresponding in number to the number of said address counter circuits, each boundary bistable means being coupled to a different one of said plurality of address counter circuits and to said address register; and
response gating means coupled to said plurality of boundary bistable means and to said bus, each of said plurality of boundary bistable means being operative in response to said output signal from the address counter circuit associated therewith to selectively switch from a first state to a second state in accordance with the state of said least significant address bit conditioning said response gating means to generate said response signal on said bus.

15. The controller of claim 14 wherein said controller further includes:

timing means coupled to said bus for selectively generating predetermined sequences of timing signals in response to each memory request for performing a memory cycle of operation within said memory modules and said timing means being coupled to said mode control means, said mode control means conditioning said timing means to generate successive predetermined sequences of said timing signals from enabling said controller to carry out said successive memory cycles of operation for read out of said consecutive words from said locations specified by said address counter circuit during the execution of said each predetermined type of request.

16. The controller of claim 15 wherein each of said plurality of address counter circuits includes a plurality of bistable stages corresponding in number sufficient to define a maximum number of pairs of words to be read out from said plurality of memory modules in response to said each predetermined type of memory request.

17. The controller of claim 16 wherein said predetermined address portion of each said predetermined type of memory request is coded to specify that said predetermined type of memory operation is to start at any word address location.

18. The controller of claim 17 wherein said mode control means includes decode gating means coupled to said bus and mode control bistable means coupled to said decode gating means, said bus including a plurality of control lines for applying coded signals to said decode means specifying said predetermined type of memory operation, said decode gating means being conditioned by said coded signals to generate an output signal for switching said mode control bistable means from said first to said second state.

19. The controller of claim 18 wherein a first of said control lines is coded to indicate when a bus double wide memory operation is to take place, a second one of said control lines is coded to indicate when a bus double word pull operation is to take place and a third one of said control lines is coded to indicate when a write cycle of operation is to take place.

20. The controller of claim 19 wherein said first through third ones of said control lines are coded to have the value "100" specifying that the operation is a double wide memory operation and not a double word pull operation and that the controller is to perform a read operation beginning at an odd or even word address as defined by the value of said least significant address bit.

21. The controller of claim 18 wherein said response gating means couples to a first one of said control lines coded to indicate when a bus double wide memory operation is to take place, each of said boundary bistable means switching to said second state when said least significant address bit is a binary ONE indicating that said predetermined type of memory operation is to begin at an odd word address and said each boundary bistable means when switched to said second state conditioning said response gating means to force said first one of said lines to a predetermined state indicating that a last word read out from one of said modules is not valid.

22. The controller of claim 18 wherein said mode control means further includes increment circuit gating means coupled to said mode control bistable means, to said bus and to each of said address counter circuits, said increment circuit gating means being operative to generate an increment signal at the end of each memory cycle of said predetermined type of memory operation upon the application of each word pair to said bus when said mode control bistable means is in said second state.

23. The controller of claim 22 wherein said mode control means further includes response generating means coupled to said increment circuit gating means and to a second one of said control lines coded to indicate when a bus double word pull operation is to take place, said response generating means being operative in response to said increment signal to switch said second one of said control lines to a predetermined state for signalling that further transfers of words are to take place when said controller is in said predetermined mode of operation.

24. The controller of claim 18 wherein said mode control means further includes:
request indicator means coupled to said mode control bistable means and to said bus, said request indicator means being switched to a predetermined state in response to each predetermined type of request indicative of said availability of said address counter circuit only when said mode control bistable means is in said first state and said request indicator means when switched to said predetermined state enabling said mode control bistable means to switch to said second state in response to said each predetermined type of request and said available one of said plurality of address counter circuits to be loaded with said predetermined address portion of said predetermined type of request.

25. The controller of claim 24 wherein said controller further includes:
multiplexer switching circuit means having a plurality of groups of input terminals, a control terminal and output terminals, each group of input terminals being coupled to a different one of said plurality of address counter circuits, said control terminal being coupled to said mode control means and said output terminals being operatively coupled to said plurality of memory modules, said multiplexer circuit means being conditioned by said mode control means to apply said predetermined address portion contents of said available one of said address counter circuits to said plurality of memory modules.

26. A memory controller for use in a system including a data processing unit and a high speed storage unit coupled to a bus in common with said controller, said controller being coupled to a plurality of memory modules, each including a plurality of word locations and said controller being operative to control the operation of said modules in response to memory requests generated by said units, said memory requests including burst memory requests, each coded to specify the read out of predetermined numbers of data words over successive memory cycles of operation by said controller independently of any memory address included within said request and each burst memory request including a memory address specifying where in said memory modules the read out of said words is to begin, said controller comprising:
a plurality of address counter circuits each being individually coupled to said bus for receiving a predetermined portion of a different one of said memory addresses and said each address counter circuit being operatively coupled to apply address signals to said plurality of modules for specifying numbers of locations to be addressed during each of said successive memory cycles of operation;

a plurality of mode control means, each coupled to a different one of said address counter circuits and to said bus, each of said plurality of mode control means when selected as available to process one of said burst requests being operative in response to said burst request to switch from a first state to a second state conditioning said controller for operating in a burst mode of operation, each of said mode control means only when in said second state generating signals for incrementing by one said predetermined address portion, the contents of said different one of said plurality of address counter circuits after each consecutive memory cycle of operation of said burst request enabling the read out of successive pairs of words from consecutive locations of said memory modules;

address boundary detection and signalling means coupled to said plurality of address counter circuits and to said bus for receiving another predetermined portion of said memory address; and, said different one of said plurality of address counter circuits upon being incremented to a predetermined count generating an output signal indicating the termination of said burst mode operation, said address boundary detection and signalling means being operative in response to said output signal to generate a response signal on said bus in accordance with said another predetermined portion of said memory address, indicating to said unit whether or not said predetermined count exceeded the address boundary defined by said predetermined type of request and said each selected mode control means switching from said second state to said first state in response to said output signal indicative of the availability of said different one of said plurality of address counter circuits for processing another burst memory request.

27. The controller of claim 26 wherein said controller includes an address register coupled to said bus for storing a signal corresponding to said another predetermined portion of said memory address representative of the least significant address bit of said memory address and wherein said address boundary detection and signalling means includes:

a plurality of boundary bistable means corresponding in number to the number of said address counter circuits, each boundary bistable means being coupled to a different one of said plurality of address counter circuits and to said address register; and response gating means coupled to said plurality of boundary bistable means and to said bus, each of said plurality of boundary bistable means being operative in response to said output signal from the address counter circuit associated therewith to selectively switch from a first state to a second state in accordance with the state of said least significant address bit conditioning said response gating means to generate said response signal on said bus.

28. The controller of claim 27 wherein said controller further includes:

timing means coupled to said bus for selectively generating predetermined sequences of timing signals in response to each memory request for performing a memory cycle of operation within said memory modules and said timing means being coupled to each of said mode control means, said each mode control means conditioning said timing means to generate successive predetermined sequences of said timing signals for enabling said controller to carry out said successive memory cycles of operation for read out of said consecutive words from said locations specified by said different one of said address counter circuits during the execution of said one burst request.

29. The controller of claim 28 wherein each of said address counter circuits includes a plurality of bistable stages corresponding in number sufficient to define a maximum number of pairs of words to be read out from said memory modules in response to said each burst request.

30. The controller of claim 29 wherein said predetermined address portion of each said burst request is coded to specify that said burst mode of operation is to start at any word address.

31. The controller of claim 30 wherein each of said mode control means includes input gating means coupled to said bus and mode control bistable means coupled to said input gating means, said bus including a plurality of control lines for applying coded signals to said input gating means specifying said burst mode of operation, said input gating means being conditioned by said coded signals to generate an output signal for switching said mode control bistable means from said first to said second state.

32. The controller of claim 31 wherein a first of said control lines is coded to indicate when a bus double wide memory operation is to take place, a second one of said control lines is coded to indicate when a bus double word pull operation is to take place and a third one of said control lines is coded to indicate when a write cycle of operation is to take place.

33. The controller of claim 32 wherein said first through third ones of said control lines are coded to have the value "100" specifying that said burst mode operation is a double wide memory operation and not a double word pull operation and that the controller is to perform a read operation beginning at an odd or even word address as defined by the value of said least significant address bit.

34. The controller of claim 31 wherein said response gating means couples to a first one of said control lines coded to indicate when a bus double wide memory operation is to take place, each of said boundary bistable means switching to said second state when said least significant address bit is a binary ONE indicating that said predetermined type of memory operation is to begin at an odd word address and said each boundary bistable means when switched to said second state conditioning said response gating means to force said first one of said lines to a predetermined state indicating that a last word read out from one of said modules is not valid.

35. The controller of claim 31 wherein each of said mode control means further includes increment circuit gating means coupled to said mode control bistable means, to said bus and to said different one of said address counter circuits, said increment circuit gating means being operative to generate an increment signal at the end of each memory cycle of said burst mode of operation upon the application of each word pair to said bus when said mode control bistable means is in said second state.

36. The controller of claim 35 wherein said controller further includes response generating means coupled to each of said increment circuit gating means and to a second one of said control lines coded to indicate when a bus double word pull operation is to take place, said response generating means being operative in response to each said increment signal to switch said second one of said control lines to a predetermined state for signalling that further transfer of words are to take place when said controller is in said burst mode of operation.

37. The controller of claim 31 wherein each of said mode control means further includes:
request indicator means coupled to said mode control bistable means and to said bus, said request indicator means being switched to a predetermined state in response to said burst request indicative of the availability of said address counter circuit associated therewith only when said mode control bistable means is in said first state and said request indicator means when switched to said predetermined state enabling said mode control bistable means to switch to said second state in response to said burst request and said address counter circuit associated therewith to be loaded with said predetermined address portion of said burst request.

38. The controller of claim 37 wherein said controller further includes:
multiplexer switching circuit means having a plurality of groups of input terminals, a control terminal and output terminals, each group of input terminals being coupled to a different one of said plurality of address counter circuits, said control terminal being coupled to said mode control means and said output terminals being operatively coupled to said plurality of memory modules, said multiplexer circuit means having conditioned by said mode control means to apply said predetermined address portion contents of said available one of said address counter circuits to said plurality of memory modules.

* * * * *